(12) United States Patent
Pedersen

(10) Patent No.: US 12,552,659 B2
(45) Date of Patent: Feb. 17, 2026

(54) MEMS DIE AND MEMS-BASED SENSOR

(71) Applicant: Knowles Electronics, LLC, Itasca, IL (US)

(72) Inventor: Michael Pedersen, Long Grove, IL (US)

(73) Assignee: Knowles Electronics, LLC, Itasca, IL (US)

( * ) Notice: Subject to any disclaimer, the term of this patent is extended or adjusted under 35 U.S.C. 154(b) by 723 days.

(21) Appl. No.: 17/571,186

(22) Filed: Jan. 7, 2022

(65) Prior Publication Data

US 2023/0106456 A1    Apr. 6, 2023

Related U.S. Application Data

(60) Provisional application No. 63/252,731, filed on Oct. 6, 2021.

(51) Int. Cl.
     B81B 3/00      (2006.01)

(52) U.S. Cl.
     CPC .......... B81B 3/0021 (2013.01); B81B 3/0067 (2013.01); *B81B 2201/0257* (2013.01)

(58) Field of Classification Search
     CPC ................ B81B 3/0021; B81B 3/0067; B81B 2201/0257; B81B 3/0078; B81B 2203/0315; B81B 2203/0361; H04R 19/005; H04R 19/04; H04R 19/016
See application file for complete search history.

(56) References Cited

U.S. PATENT DOCUMENTS

| | | | |
|---|---|---|---|
| 4,154,115 | A | 5/1979 | Hartung et al. |
| 4,435,986 | A | 3/1984 | Choffat |
| 6,075,867 | A | 6/2000 | Bay et al. |
| 6,431,003 | B1 | 8/2002 | Stark et al. |

(Continued)

FOREIGN PATENT DOCUMENTS

| | | | |
|---|---|---|---|
| CN | 103344377 A | | 10/2013 |
| CN | 106162476 A | | 11/2016 |

(Continued)

OTHER PUBLICATIONS

Andrews et al., "A comparison of squeeze-film theory with measurements on a microstructure," Sensors and Actuators A 36 (1993) 79-87, 9 pages.

(Continued)

*Primary Examiner* — Steven B Gauthier
*Assistant Examiner* — Sun Mi Kim King
(74) *Attorney, Agent, or Firm* — FLENER IP & BUSINES LAW; Zareefa B. Flener; Yongae Jun

(57) ABSTRACT

Various implementations of MEMS sensors include an IC die having a cavity that forms at least part of the back volume of the sensor. This arrangement helps to address the problems of lateral velocity gradients and viscosity-induced losses. In some of the embodiments, the cavity is specially configured (e.g., with pillars, channels, and/or rings) to reduce the lateral movement of air. Other solutions (used in conjunction with such cavities) include ways to make a diaphragm move more like a piston (e.g., by adding a protrusion that gives it more "up-down" motion and less lateral motion) or to use a piston (e.g., a rigid piece of silicon such as an integrated circuit die) in place of a diaphragm.

11 Claims, 24 Drawing Sheets

(56) References Cited

U.S. PATENT DOCUMENTS

| | | |
|---|---|---|
| 6,435,033 B2 | 8/2002 | Delaye |
| 6,535,460 B2 | 3/2003 | Loeppert et al. |
| 6,571,445 B2 | 6/2003 | Ladabaum |
| 6,662,663 B2 | 12/2003 | Chen |
| 7,030,407 B2 | 4/2006 | Michler |
| 7,040,173 B2 | 5/2006 | Dehe |
| 7,124,638 B2 | 10/2006 | Kandler |
| 7,150,195 B2 | 12/2006 | Jacobsen et al. |
| 7,190,038 B2 | 3/2007 | Dehe et al. |
| 7,470,546 B2 | 12/2008 | Lehmann |
| 7,489,593 B2 | 2/2009 | Nguyen-Dinh et al. |
| 7,535,156 B2 | 5/2009 | Kvisteroy et al. |
| 7,545,012 B2 | 6/2009 | Smith et al. |
| 7,781,249 B2 | 8/2010 | Laming et al. |
| 7,793,550 B2 | 9/2010 | Elian et al. |
| 7,795,695 B2 | 9/2010 | Weigold et al. |
| 7,825,484 B2 | 11/2010 | Martin et al. |
| 7,829,961 B2 | 11/2010 | Hsiao |
| 7,903,831 B2 | 3/2011 | Song |
| 7,918,135 B2 | 4/2011 | Hammerschmidt |
| 8,127,619 B2 | 3/2012 | Hammerschmidt |
| 8,339,764 B2 | 12/2012 | Steeneken et al. |
| 8,461,655 B2 | 6/2013 | Klein et al. |
| 8,575,037 B2 | 11/2013 | Friza et al. |
| 8,650,963 B2 | 2/2014 | Barr et al. |
| 8,723,277 B2 | 5/2014 | Dehe et al. |
| 8,809,973 B2 | 8/2014 | Theuss |
| 8,969,980 B2 | 3/2015 | Lee |
| 8,989,411 B2 | 3/2015 | Hall et al. |
| 9,031,266 B2 | 5/2015 | Dehe et al. |
| 9,179,221 B2 | 11/2015 | Barzen et al. |
| 9,181,080 B2 | 11/2015 | Dehe et al. |
| 9,237,402 B2 | 1/2016 | Loeppert |
| 9,321,630 B2 | 4/2016 | Xu et al. |
| 9,332,330 B2 | 5/2016 | Elian et al. |
| 9,380,381 B2 | 6/2016 | Straeussnigg et al. |
| 9,383,282 B2 | 7/2016 | Besling et al. |
| 9,383,285 B2 | 7/2016 | Phan Le et al. |
| 9,425,757 B2 | 8/2016 | Straeussnigg et al. |
| 9,432,759 B2 | 8/2016 | Elian et al. |
| 9,438,979 B2 | 9/2016 | Dehe |
| 9,510,107 B2 | 11/2016 | Dehe et al. |
| 9,516,428 B2 | 12/2016 | Dehe et al. |
| 9,549,263 B2 | 1/2017 | Uchida |
| 9,550,211 B2 | 1/2017 | Dirksen et al. |
| 9,631,996 B2 | 4/2017 | Wiesbauer et al. |
| 9,689,770 B2 | 6/2017 | Hammerschmidt |
| 9,828,237 B2 | 11/2017 | Walther et al. |
| 9,884,757 B2 | 2/2018 | Winkler et al. |
| 9,903,779 B2 | 2/2018 | Hammerschmidt |
| 9,942,677 B2 | 4/2018 | Wiesbauer et al. |
| 10,129,676 B2 | 11/2018 | Walther et al. |
| 10,231,061 B2 | 3/2019 | Dehe et al. |
| 10,322,481 B2 | 6/2019 | Dehe et al. |
| 10,433,070 B2 | 10/2019 | Dehe et al. |
| 10,560,771 B2 | 2/2020 | Dehe et al. |
| 10,582,306 B2 | 3/2020 | Dehe |
| 10,589,990 B2 | 3/2020 | Dehe et al. |
| 10,641,626 B2 | 5/2020 | Bretthauer et al. |
| 10,669,151 B2 | 6/2020 | Strasser et al. |
| 10,676,346 B2 | 6/2020 | Walther et al. |
| 10,689,250 B2 | 6/2020 | Fueldner et al. |
| 10,715,926 B2 | 7/2020 | Bretthauer et al. |
| 10,939,214 B2 | 3/2021 | Kuntzman et al. |
| 2005/0177045 A1 | 8/2005 | Degertekin et al. |
| 2005/0207605 A1 | 9/2005 | Dehe et al. |
| 2005/0219953 A1 | 10/2005 | Bayram et al. |
| 2007/0205492 A1 | 9/2007 | Wang |
| 2007/0278501 A1 | 12/2007 | Macpherson et al. |
| 2008/0175425 A1 | 7/2008 | Roberts et al. |
| 2008/0267431 A1 | 10/2008 | Leidl et al. |
| 2008/0279407 A1 | 11/2008 | Pahl |
| 2008/0283942 A1 | 11/2008 | Huang et al. |
| 2009/0001553 A1 | 1/2009 | Pahl et al. |
| 2009/0175477 A1 | 7/2009 | Suzuki et al. |
| 2009/0180655 A1 | 7/2009 | Tien et al. |
| 2009/0208037 A1* | 8/2009 | Zhe ............... H04R 19/005 |
| | | 381/174 |
| 2010/0046780 A1 | 2/2010 | Song |
| 2010/0052082 A1 | 3/2010 | Lee et al. |
| 2010/0128914 A1 | 5/2010 | Khenkin |
| 2010/0164025 A1* | 7/2010 | Yang ............... B81C 1/00246 |
| | | 257/416 |
| 2010/0170346 A1 | 7/2010 | Opitz et al. |
| 2010/0173437 A1 | 7/2010 | Wygant et al. |
| 2010/0183181 A1 | 7/2010 | Wang |
| 2010/0246877 A1 | 9/2010 | Wang et al. |
| 2010/0290644 A1 | 11/2010 | Wu et al. |
| 2010/0322443 A1 | 12/2010 | Wu et al. |
| 2010/0322451 A1 | 12/2010 | Wu et al. |
| 2011/0013787 A1 | 1/2011 | Chang |
| 2011/0075875 A1 | 3/2011 | Wu et al. |
| 2013/0001550 A1 | 1/2013 | Seeger et al. |
| 2014/0071642 A1 | 3/2014 | Theuss |
| 2015/0001647 A1 | 1/2015 | Dehe et al. |
| 2015/0090043 A1 | 4/2015 | Ruhl et al. |
| 2015/0247879 A1 | 9/2015 | Meinhold |
| 2015/0296307 A1 | 10/2015 | Shao et al. |
| 2016/0096726 A1 | 4/2016 | Dehe et al. |
| 2018/0091906 A1 | 3/2018 | Khenkin et al. |
| 2018/0194615 A1* | 7/2018 | Nawaz ............... B81B 3/0027 |
| 2018/0234774 A1 | 8/2018 | Walther et al. |
| 2018/0317022 A1 | 11/2018 | Evans et al. |
| 2019/0112182 A1 | 4/2019 | Metzger-Brueckl et al. |
| 2019/0181776 A1 | 6/2019 | Tumpold et al. |
| 2019/0246459 A1 | 8/2019 | Tumpold et al. |
| 2019/0270639 A1 | 9/2019 | Lorenz et al. |
| 2019/0331531 A1 | 10/2019 | Glacer et al. |
| 2019/0339193 A1 | 11/2019 | Eberl et al. |
| 2019/0352175 A1 | 11/2019 | Tumpold et al. |
| 2019/0363757 A1 | 11/2019 | Mikolajczak et al. |
| 2020/0057031 A1 | 2/2020 | Theuss et al. |
| 2021/0120323 A1 | 4/2021 | Naderyan et al. |
| 2021/0176569 A1* | 6/2021 | Nawaz ............... H04R 19/005 |
| 2022/0298005 A1* | 9/2022 | Loeppert ............... H04R 7/04 |

FOREIGN PATENT DOCUMENTS

| | | |
|---|---|---|
| CN | 206212271 U | 5/2017 |
| CN | 108551646 A | 9/2018 |
| CN | 110115048 A | 9/2019 |
| KR | 100571967 B1 | 4/2006 |
| WO | 2012085335 A1 | 6/2012 |
| WO | 2019183283 A2 | 9/2019 |

OTHER PUBLICATIONS

Bay et al., "Design of a silicon microphone with differential read-out of a sealed double parallel-plate capacitor," Sensors and Acutators A 53 (1996), pp. 232-236, 5 pages.

Hansen et al., "Wideband micromachined capacitive microphones with radio frequency detection," J. Acoust. Soc. Am. 116 (2), Aug. 2004, pp. 828-842, 15 pages.

Lin, Der-Song, "Interface Engineering of Capacitive Micromachined Ultrasonic Transducers for Medical Applications," A Dissertation Submitted to the Department of Mechanical Engineering and the Committee on Graduate Studies of Stanford University in Partial Fulfillment of the Requirements for the Degree of Doctor of Philosophy, Jun. 2011, 168 pages.

Park et al., "Fabrication of Capacitive Micromachined Ultrasonic Transducers via Local Oxidation and Direct Wafer Bonding," Journal of Microelectromechanical Systems, vol. 20, No. 1, Feb. 2011, 10 pages.

Krzysztof Iniewski, "Smart Sensors for Industrial Applications," Figure 19. 1, p. 306, 1 page (2013).

Wygant et al., "50 kHz Capacitive Micromachined Ultrasonic Transducers for Generation of Highly Directional Sound with Parametric Arrays," IEEE Transactions on Ultrasonics, Fer-

(56) References Cited

OTHER PUBLICATIONS roelectrics, and Frequency Control, vol. 56, No. 1, Jan. 2009, pp. 193-203, 11 pages.

* cited by examiner

MEMS DIE AND MEMS-BASED SENSOR

CROSS-REFERENCE TO RELATED APPLICATIONS

This application claims the benefit of priority to U.S. Provisional Patent Application No. 63/252,731 filed on Oct. 6, 2021 and incorporated in its entirety by reference herein.

FIELD OF THE DISCLOSURE

The present disclosure relates to microelectromechanical systems MEMS-based sensors.

BACKGROUND

Sensors that include microelectromechanical systems (MEMS) dies convert pressure waves (e.g., resulting from sound) into an electrical signal. Microphone assemblies that employ such sensors may be used in mobile communication devices, laptop computers, and appliances, among other devices and machinery. An important parameter for a microphone assembly is the acoustic signal-to-noise ratio (SNR), which compares the desired signal level (e.g., the signal amplitude due to acoustic disturbances captured by the microphone assembly) to the level of background noise. In microphone assemblies that include MEMS acoustic dies, SNR often limits the smallest dimensions that can be achieved and the overall package size of the microphone assembly.

One potential problem with using diaphragm-based capacitive MEMS sensors is that the dynamic movement of the diaphragm itself results in a lateral velocity gradient and viscosity-induced losses. Any initial diaphragm deflection due to, for example, applied bias voltage in combination with the close proximity of other structures near the diaphragm accentuates the viscous losses.

DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope.

DETAILED DESCRIPTION

Figure 1A:
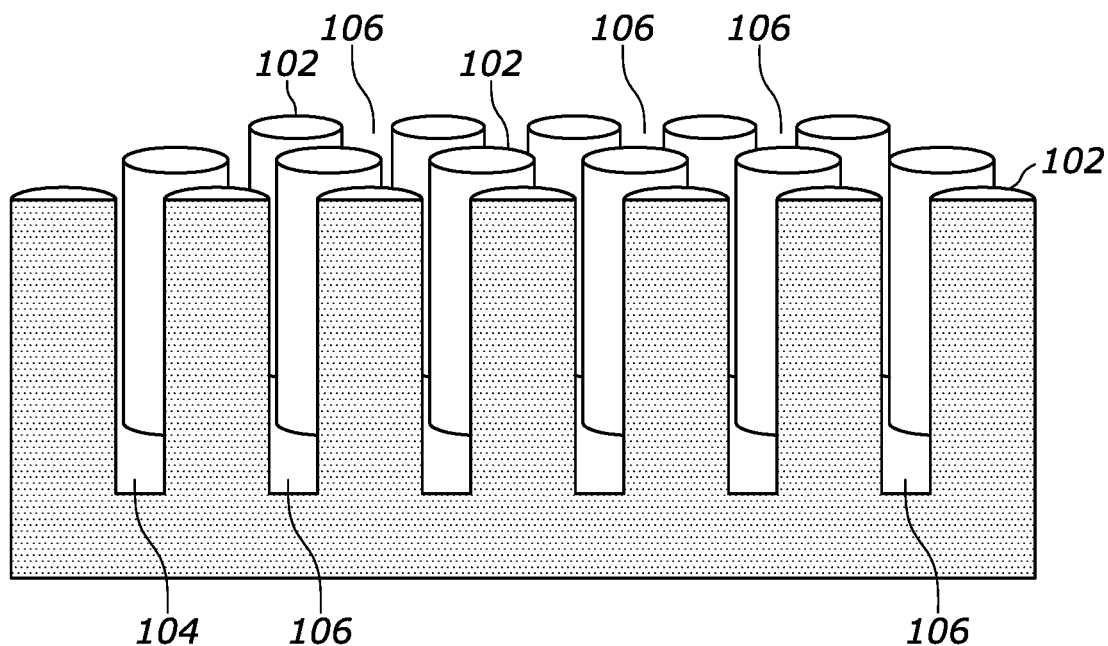
FIG. 1A is a perspective and sectional view of a cavity (in an integrated circuit (IC) die or MEMS die of a MEMS sensor) in which pillars are used, according to an embodiment.

In the present disclosure, embodiments of MEMS sensors are described, in which an IC die in the sensor includes a cavity that forms at least part of the back volume of the sensor. This arrangement helps to address the problems of lateral velocity gradients and viscosity-induced losses. In some of the embodiments, the cavity is specially configured (e.g., with pillars, channels, and/or rings) to reduce the lateral movement of air. Other solutions (used in conjunction with such cavities) include ways to make a diaphragm move more like a piston (e.g., by adding a protrusion that gives it more "up-down" motion and less lateral motion) or to use a piston (e.g., a rigid piece of silicon such as an integrated circuit die) in place of a diaphragm.

As used herein, the phrase "enclosed volume" or "enclosed back volume" refers to a volume (such as a back volume) that is substantially enclosed but may not be fully enclosed. For example, the enclosed volume may refer to a volume that is fluidly connected with an environment surrounding a MEMS sensor via a pierce or opening in a diaphragm, in a piston, or in a resilient structure.

Various embodiments of MEMS sensors described herein include an integrated circuit (IC) die and a MEMS die that are coupled to one another. Although these dies may be referred to as distinct bodies, it is to be understood that the entire MEMS sensor can be fabricated as a single die (e.g., made from a single piece of silicon). In some embodiments, a cavity is provided in the MEMS die in addition to a cavity in the IC die. The cavity (in either die) is configured to increase the compliance of air in the back volume (e.g., by reducing the stiffness of the air contained within the back volume), which increases the sensitivity of the MEMS sensor. The cavity includes channels which, in some embodiments, are sized to reduce thermal-acoustic noise within the MEMS sensor.

Any of the MEMS sensors described herein may be incorporated in a compact computing device (e.g., a portable communication device, a smartphone, a smart speaker, or an internet of things (IoT) device), where one, two, three or more sensors may be integrated for picking-up and processing various types of acoustic signals such as speech and music.

According to some embodiments, each cavity is configured such that every point within channels of the cavity is no further away from a solid surface than the thickness of a single thermal boundary layer. For example, in some embodiments, a width (e.g., diameter) of each one of the plurality of channels is less than two times the thermal boundary layer thickness within the back volume over a majority of an audio frequency band of the MEMS sensor. The thermal boundary layer thickness may be determined approximately as $$\delta_t = \sqrt{\frac{2\kappa}{\omega \rho_0 C_p}}$$

where $\omega$ is the operating angular frequency of the sensor (e.g., the microphone), and where $\kappa$ is the thermal conductivity, $\rho_0$ is the density, and $C_p$ is the specific heat at constant pressure of the gas inside the sensor assembly (e.g., within the back volume of the sensor assembly). The relationship above illustrates the dependency between the thermal boundary layer thickness and the operating frequency of the sensor.

It will be appreciated that the geometry of the channels may be different in various embodiments.

In various embodiments described herein, channels of a cavity in an IC die or a cavity in a MEMS die (or in part of a MEMS die, such as a protrusion on a diaphragm) may be defined by pillars or rings extending from an inner surface of the cavity. Turning to FIG. 1A through FIG. 1H, examples of pillar and ring arrangements for such cavities are shown. It should be noted that in the interest of clarity only some of the pillars, channels, and rings have been labelled. The description, however, applies to all pillars or rings shown, unless noted otherwise. Also, the orientation of the cavities depicted in FIG. 1A through FIG. 1H should not be taken as limiting. Cavities can be oriented in any direction (e.g., facing upward or facing downward), and those depicted in FIG. 1A through FIG. 1H are only meant to be examples.

Figure 1B:
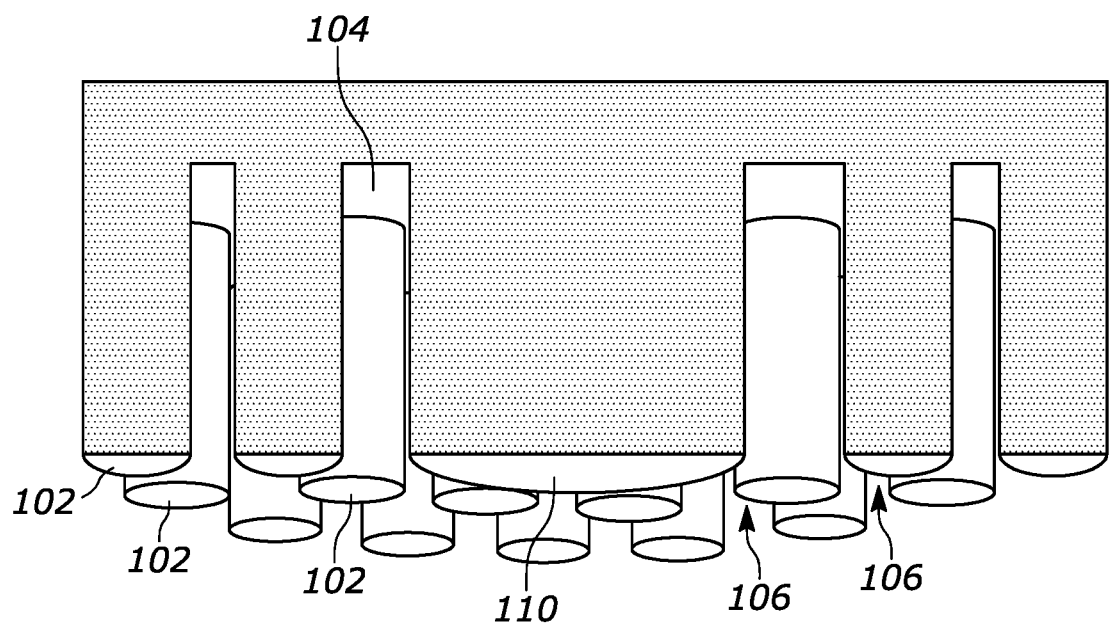
FIG. 1B is a perspective and sectional view of a cavity (in an IC die or MEMS die of a MEMS sensor) in which pillars are used, with a larger central portion, according to an embodiment.

A partial cross-sectional view of an example of a pillar configuration is depicted in FIG. 1A, in which a cavity includes pillars 102 extending from an inner surface 104 of the cavity. There are channels 106 between the pillars 102. The channels 106 are defined by the pillars and by the inner surface 104. In some embodiments, the pillars 102 are cylinders that extend from a lower surface of the cavity in a substantially perpendicular orientation relative to the lower surface (the lower surface being furthest from the opening of the cavity). In other embodiments, the shape of the pillars 102 may be different. FIG. 1B shows a partial cross-sectional view of an alternative embodiment, in which the cavity wraps around a central portion 110 (configured as a larger pillar in this example).

Figure 1C:
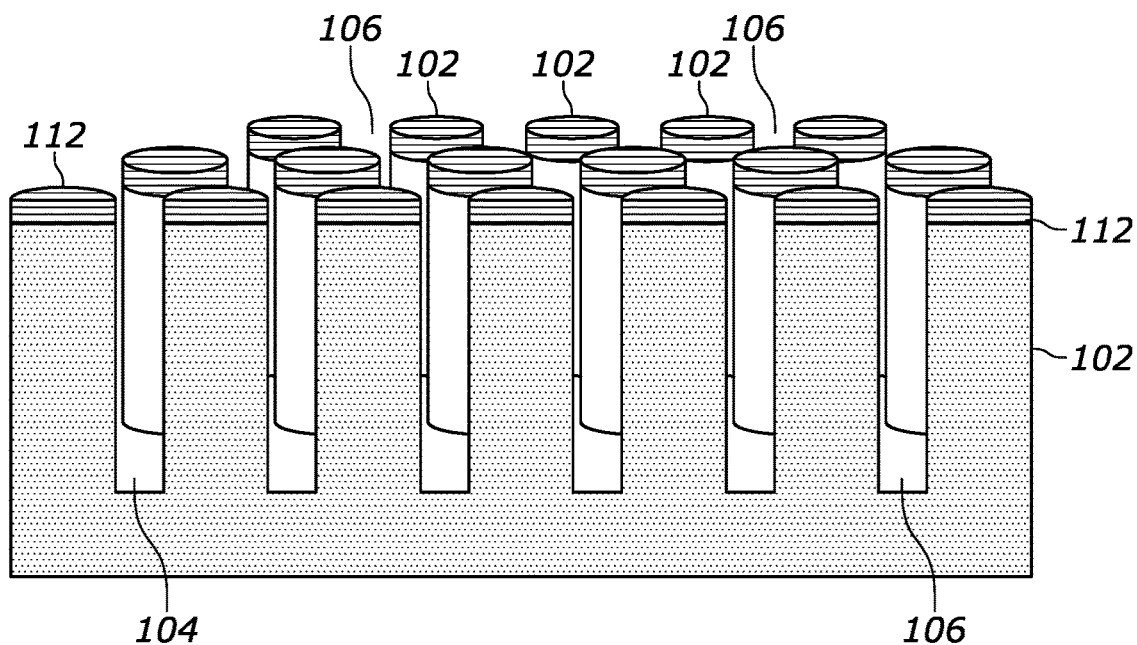
FIG. 1C is a perspective and sectional view of a cavity (in an IC die or MEMS die of a MEMS sensor) in which pillars are used, and in which an electrode is distributed among the pillars (along the tops) at an opening of the cavity, according to an embodiment.
Figure 1D:
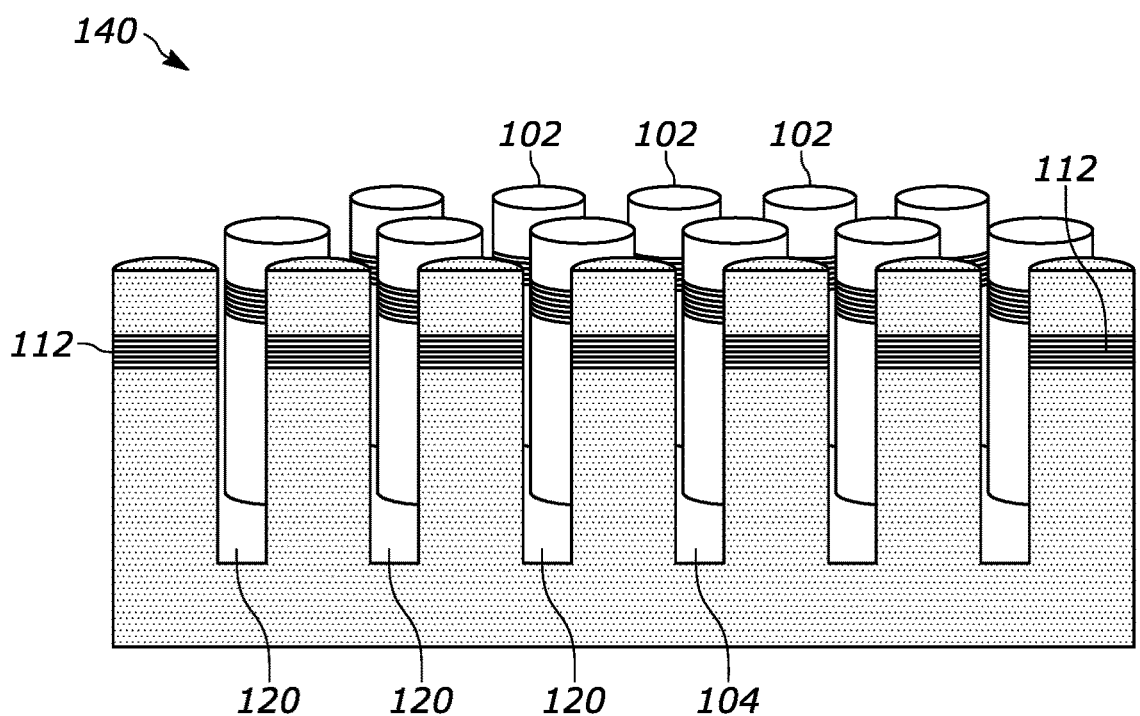
FIG. 1D is a perspective and sectional view of a cavity (in an IC die or MEMS die of a MEMS sensor) in which pillars are used, and in which an electrode is distributed among the pillars at an opening of the cavity, according to an embodiment.
Figure 1E:
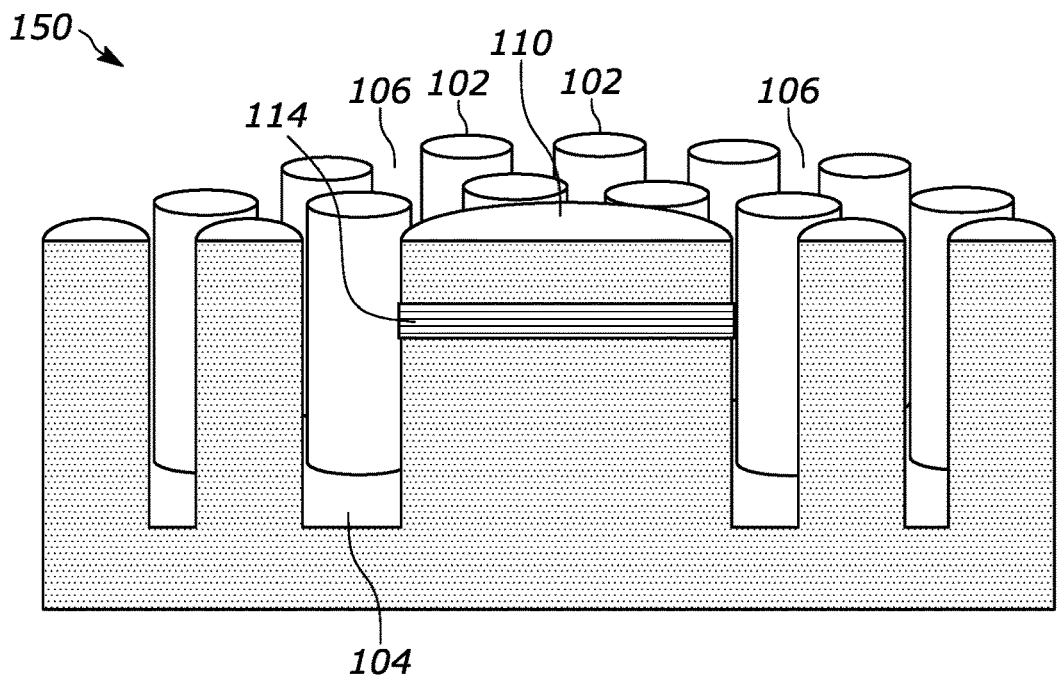
FIG. 1E is a perspective and sectional view of a cavity (in an IC die or MEMS die of a MEMS sensor) in which pillars are used, with a larger central portion having an electrode, according to an embodiment.

Turning to FIG. 1C and FIG. 1D, in some embodiments an electrode 112 is distributed among the tops of the pillars of the cavity (FIG. 1C) or near the tops of the pillars (FIG. 1D) of the cavity. The electrode 112 comprises an electrically conductive layer that is connected (e.g., with a TSV down the long axis of each pillar) to a single, common conductor. In those embodiments in which the cavity wraps around a central portion 110 (as shown, for example, in FIG. 1B), the central portion 110 itself may include an electrode, an example of which is shown in the cavity of FIG. 1E, in which an electrode 114 comprises a conductive layer near a surface of the central portion 110.

Figure 1F:
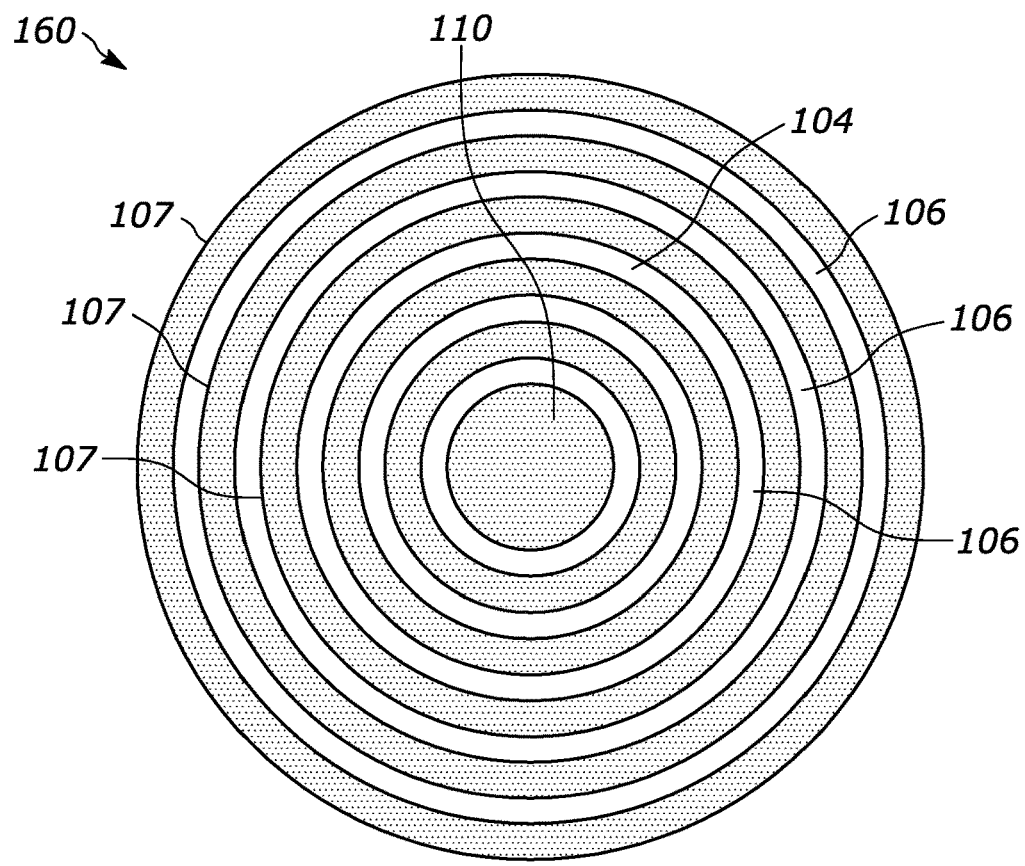
FIG. 1F is top view of a cavity (in an IC die or MEMS die of a MEMS sensor) in which rings are used, according to an embodiment.
Figure 1G:
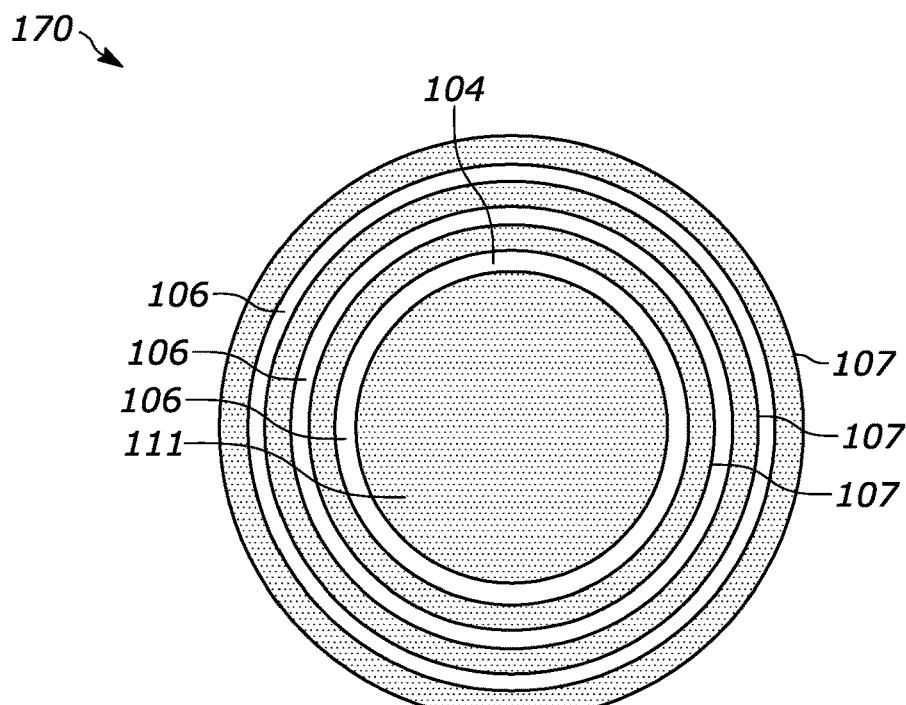
FIG. 1G is top view of a cavity (in an IC die or MEMS die of a MEMS sensor) in which rings are used, with a larger central portion, according to an embodiment.
Figure 1H:
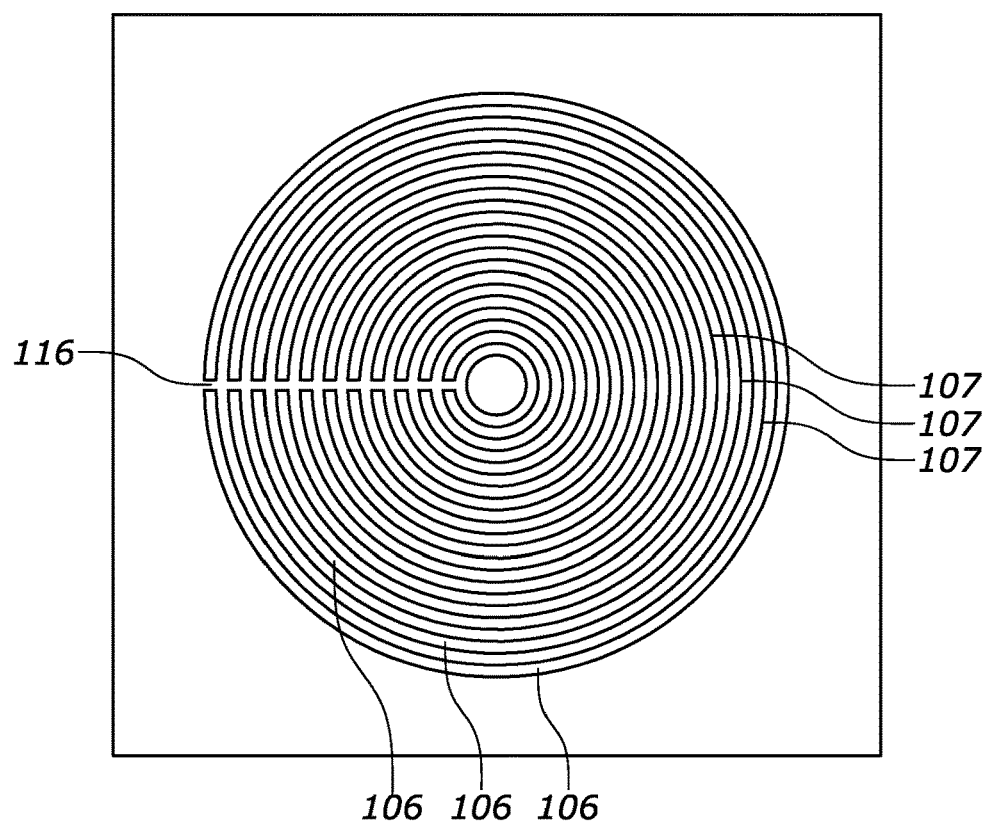
FIG. 1H is top view of a cavity (in an IC die or MEMS die of a MEMS sensor) in which rings are used, and in which an electrode is distributed among the rings at an opening of the cavity, according to an embodiment.

Referring to FIG. 1F, FIG. 1G, and FIG. 1H, top views of cavities (of an IC die or of a MEMS die) having rings (according to various embodiments of the disclosure) are shown. FIG. 1F shows a cavity in which the channels 106 are defined by concentric rings 107 extending from an inner surface of the cavity. FIG. 1G shows a cavity in which the channels 106 are defined by concentric rings 107 around a central portion 111 (depicted as a large central pillar). FIG.

1H shows a cavity in which the channels 106 are defined by concentric rings 107, which have an electrically conductive layer (which functions as an electrode) on their surface closest to the opening. In this embodiment, a single conductive rib 116 electrically connects the parts of the electrically conductive layer on the respective ring.

Figure 2A:
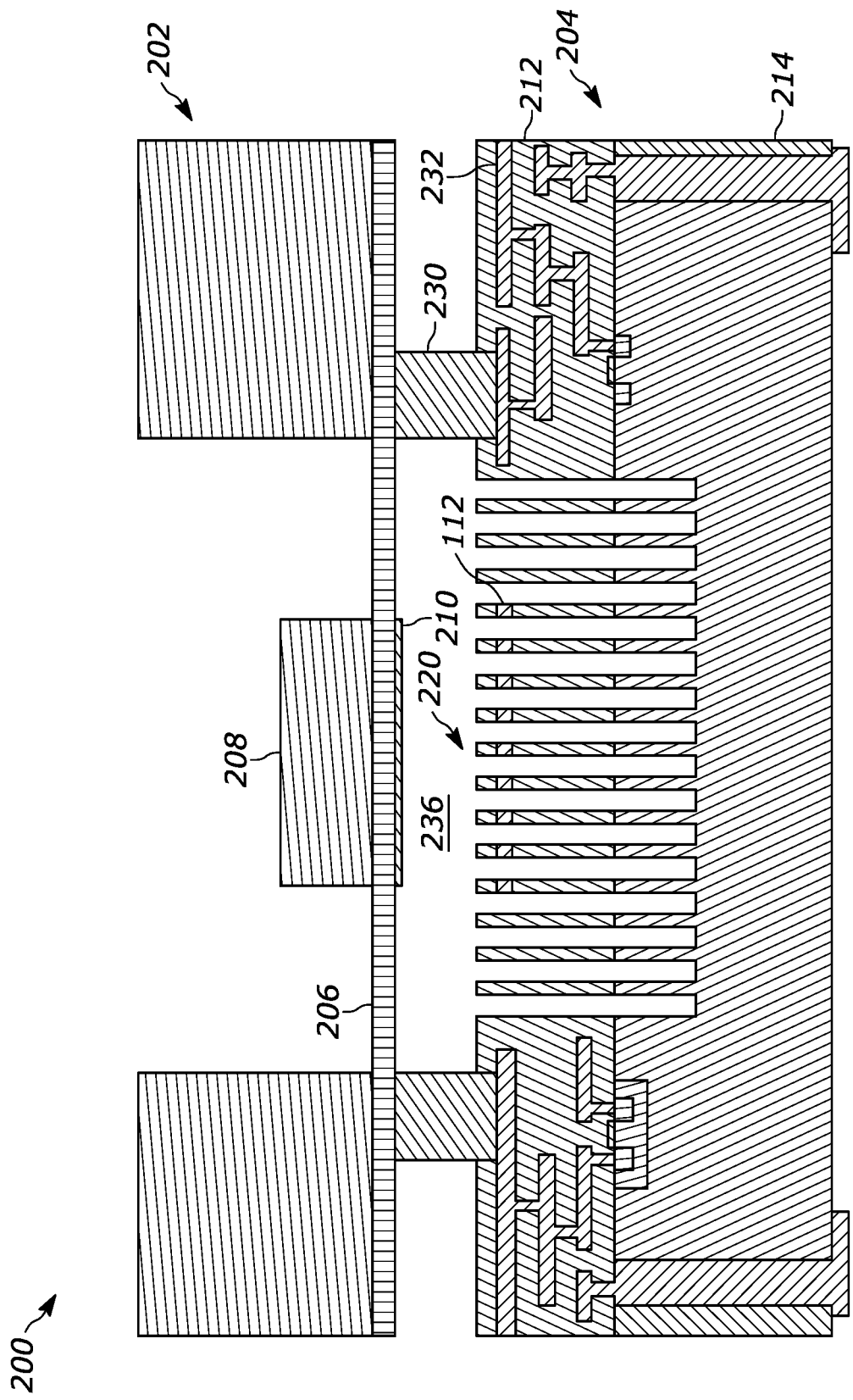
FIG. 2A is a cross-sectional view of a MEMS sensor having an IC die and a MEMS die, where the MEMS die includes a diaphragm having a protruding structure (e.g., a boss), in which an IC on the IC die faces the diaphragm, according to an embodiment.
Figure 2B:
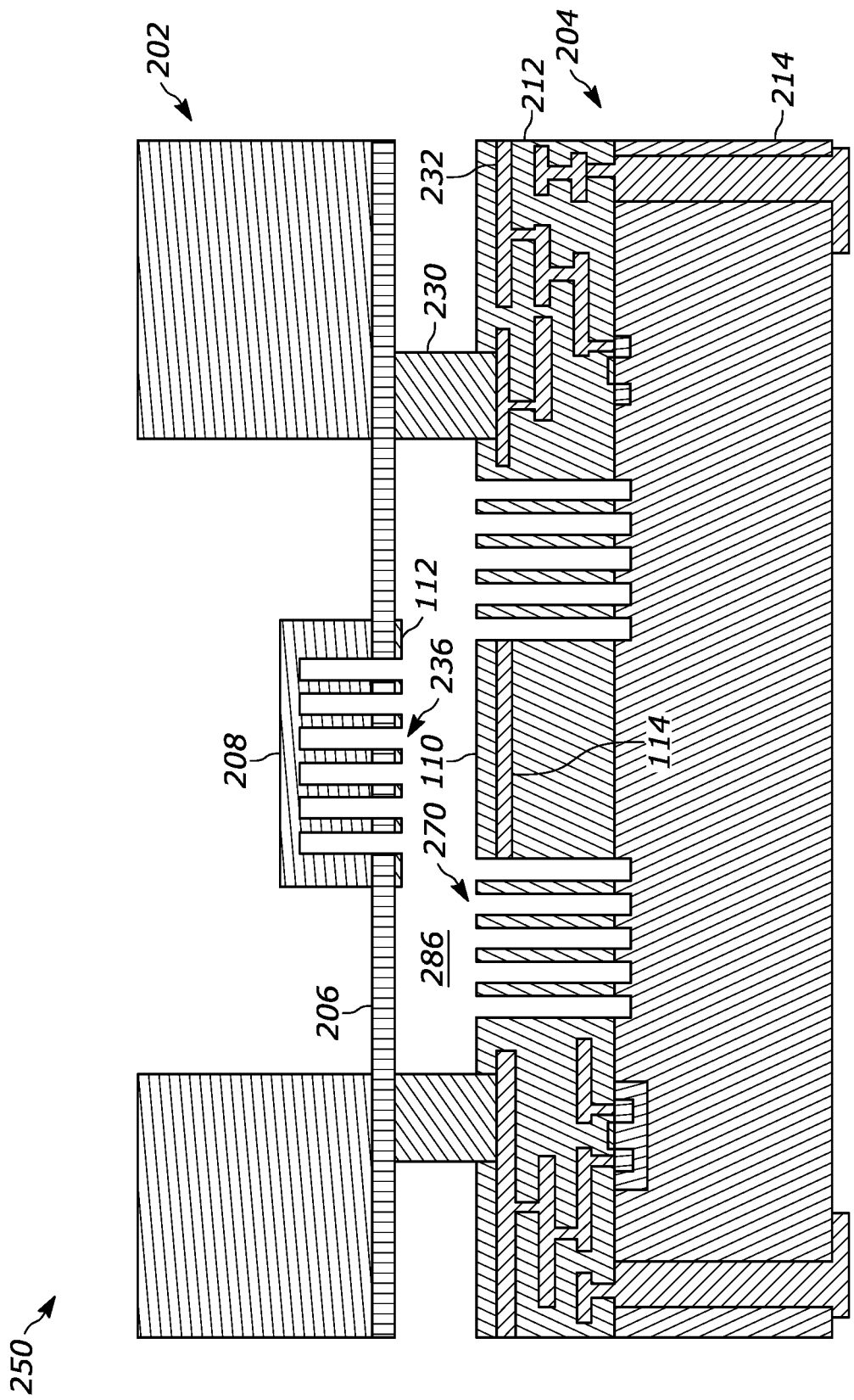
FIG. 2B is a cross-sectional view of MEMS sensor that is variation on the embodiment depicted in FIG. 2A.

In FIG. 2A and FIG. 2B, different embodiments of a MEMS sensor are shown. In these embodiments, the sensor includes an IC die having a cavity, and a diaphragm facing a surface of the IC die, in which the cavity of the IC die forms at least a portion of a back volume of the sensor. The sensor includes a boss that protrudes from a center of the diaphragm. Furthermore, the diaphragm has a first electrode and there is also a second electrode embedded in the cavity of the IC die. During operation of the sensor, the diaphragm moves in response to changes in pressure, thereby changing a capacitance between the first electrode and the second electrode. A circuit on the IC die detects the change in capacitance and processes one or more signals representing the change.

In the embodiments of FIG. 2A and FIG. 2B, the IC die is oriented so that the IC is closer to the diaphragm than the substrate of the IC die is. Turning to FIG. 2A, a MEMS sensor 200 includes a MEMS die 202 and an IC die 204. The MEMS die 202 includes a diaphragm 206, and a protrusion— depicted as a boss 208— extending from a center of the diaphragm 206. The boss 208 causes the movement of the diaphragm 206 to be more like a piston during operation of the MEMS sensor 200. In general, having the movement of air between the diaphragm 206 and the IC die 204 be more in the "up and down" direction reduces noise. The diaphragm 206 includes an electrode 210 (also referred to as a first electrode).

The IC die 204 includes an IC 212 (e.g., a set of electronic circuits on semiconductor material) and a substrate 214 (e.g., a silicon substrate). The IC die 204 has a cavity 220. Possible structures for the cavity 220 include that of FIG. 1D or that of FIG. 1H. The cavity 220 extends through a portion of the IC 212 and through a portion of the substrate 214. In some embodiments, the cavity 220 only extends into the IC 212. The IC 212 includes the electrode 112, which is also referred to as a second electrode in this context.

In an embodiment, the first electrode 210 is connected to a bias voltage source of the IC 212 by way of a structure 230 (e.g., a eutectic metal contact) and a conductive path 232 within the IC 212 (with through-silicon vias (TSVs) as appropriate). The second electrode 112 is electrically connected to a circuit on the IC 212 (e.g., to an amplifier input thereof). Alternatively, the first electrode 210 may be electrically connected to a circuit of the IC 212 and the second electrode 112 may be electrically connected to the bias voltage source of the IC 212. Thus, in some embodiments the IC provides a bias voltage to the first electrode and reads a signal coming from the second electrode, and in other embodiments the IC provides a bias voltage to the second electrode and reads a signal coming from the first electrode.

A back volume 236 of the MEMS sensor 200 is bounded by the diaphragm 206, the structure 230, and the walls and surfaces (e.g., the pillars or rings) within the cavity 220. As air pressure changes outside of the back volume 236 (e.g., as a result of acoustic pressure waves), the diaphragm 206 flexes, causing the first electrode 210 to move either towards or away from the second electrode 112, thereby changing a capacitance therebetween. This change in capacitance is represented by electrical signals that get transmitted to a circuit of the IC 212, which converts the signals into an analog or digital representation of sound or vibration.

Turning to FIG. 2B, MEMS sensor 250 is a variation on the MEMS sensor 200 of FIG. 2A. In this embodiment, the boss 208 has a cavity 236 defined therein. Possible configurations of the cavity 236 of the boss 208 include that of FIG. 1C and that of FIG. 1H.

Furthermore, instead of the cavity 220 of FIG. 2A, the IC die 204 of the MEMS sensor 250 of FIG. 2B has a cavity 270 that wraps around a central portion 110 in the IC die 204. A second electrode 114 is embedded in the central portion 110. Possible configurations of the cavity 270 include that of FIG. 1E.

A back volume 286 of the MEMS sensor 250 is bounded by the diaphragm 206, the structure 230, and the walls and surfaces (e.g., the pillars or rings) within the cavity 270 of the IC die 204 and the cavity 236 of the boss 208. As air pressure changes outside of the back volume 286 (e.g., as a result of acoustic pressure waves), the diaphragm 206 flexes, causing the first electrode 112 to move either towards or away from the second electrode 114, thereby changing a capacitance therebetween. This change in capacitance is represented by electrical signals that get transmitted to a circuit of the IC 212, which converts the signals into an analog or digital representation of sound or vibration.

Figure 3A:
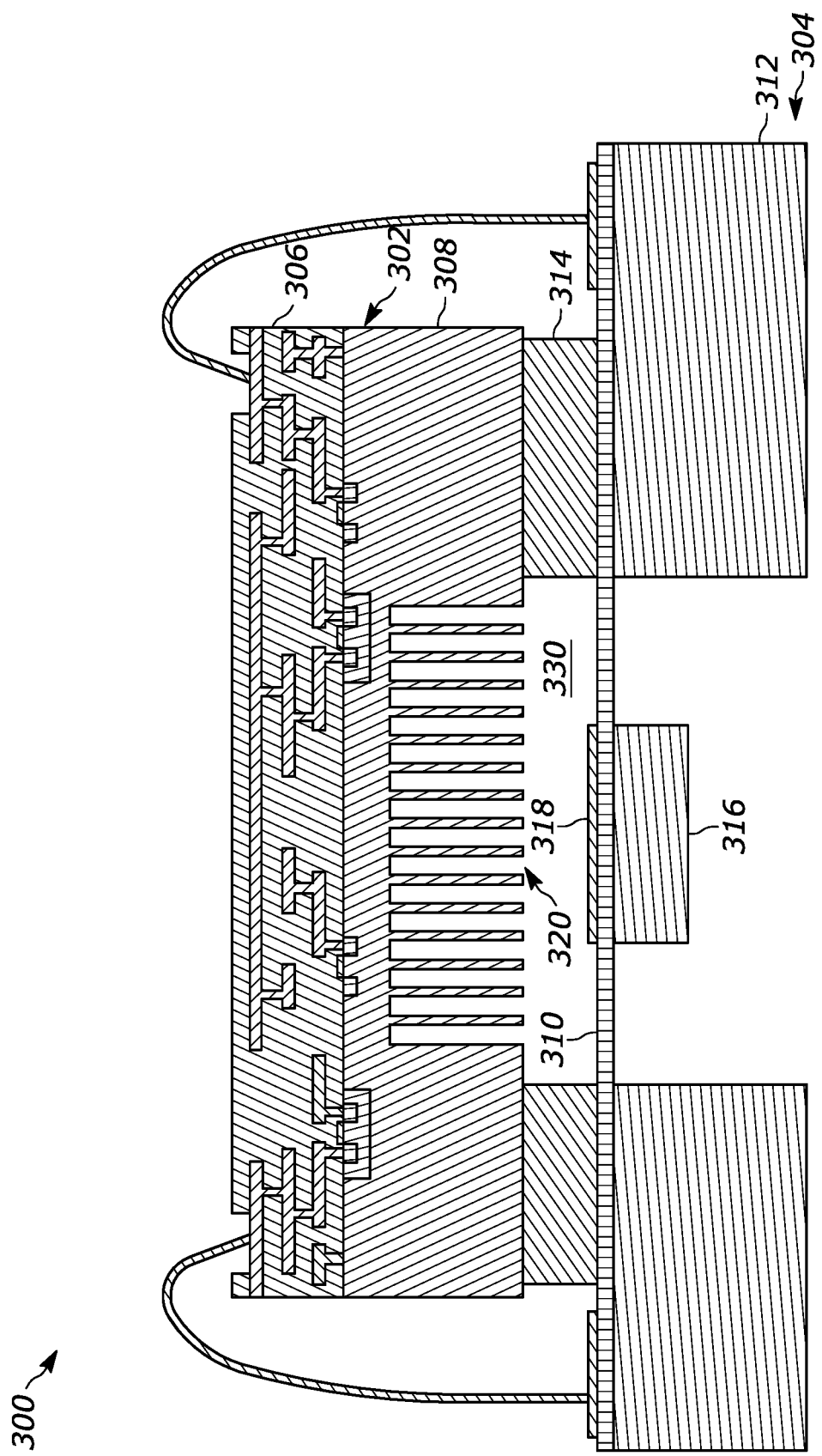
FIG. 3A is a cross-sectional view of an embodiment of a MEMS sensor having an IC die and a MEMS die, where the MEMS die includes a diaphragm having a protruding structure (e.g., a boss), in which a substrate of the IC die has a cavity and faces the diaphragm.
Figure 3B:
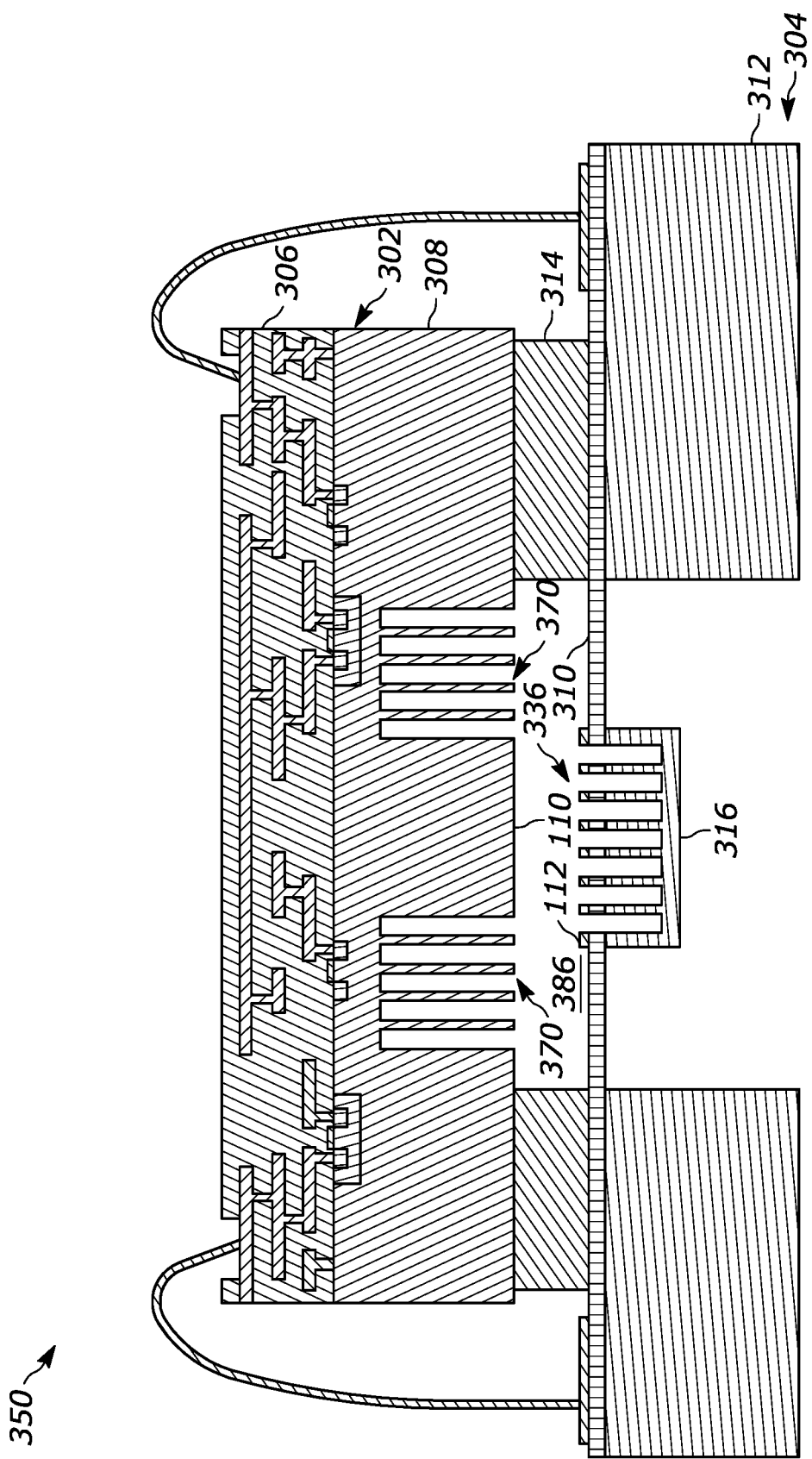
FIG. 3B is a cross-sectional view of a MEMS sensor that is a variation on the embodiment depicted in FIG. 3A.

In FIG. 3A and FIG. 3B, further embodiments of a MEMS sensor are shown. In these embodiments, the sensor includes an IC die having a cavity, and a diaphragm facing a surface of the IC die, in which the cavity of the IC die forms at least a portion of a back volume of the sensor. The sensor includes a boss that protrudes from a center of the diaphragm. The diaphragm has an electrode. A substrate of the IC die acts as a second electrode (e.g., it may be doped so that it is electrically active). During operation of the sensor, the diaphragm moves in response to changes in pressure, thereby changing a capacitance between the electrode and the IC die. A circuit on the IC die detects the change in capacitance and processes one or more signals representing the change. In the embodiments of FIG. 3A and FIG. 3B, the IC die is oriented so that the substrate of the IC die is closer to the diaphragm than the IC itself.

Turning to FIG. 3A, a MEMS sensor according to another embodiment is shown. The MEMS sensor 300 includes an IC die 302 and a MEMS die 304 coupled to the IC die 302. The IC die 302 includes an IC 306 on a substrate (e.g., silicon substrate) 308. The MEMS die 304 includes a diaphragm 310 and a substrate 312. The substrate 308 of the IC die 302 is attached to the MEMS die 304 via a structure 314 (e.g., a eutectic metal contact). The layer of material (e.g., the layer of silicon nitride) from which the diaphragm 310 is made is sandwiched between the structure 314 and the substrate 312 of the MEMS die 304. The MEMS die 304 further includes a boss 316 extending from a center of the diaphragm 310. The boss 316 in this embodiment serves the same purpose as the boss 208 in the embodiments of FIG. 2A and FIG. 2B. The diaphragm 310 includes an electrode 318. The substrate 308 of the IC die 302 has a cavity 320 therein. Possible configurations of the cavity 320 include that of FIG. 1A and that of FIG. 1F.

In an embodiment, the electrode 318 is electrically connected to a bias voltage source on the IC 306, and the substrate 308 of the IC die 302 is electrically connected to a circuit of the IC 306. In other embodiments, the electrode 318 is electrically connected to the IC 306 and the substrate 308 of the IC die 302 is electrically connected to the bias voltage source on the IC 302. Thus, in some embodiments the IC provides a bias voltage to the first electrode and reads a signal coming from the second electrode, and in other embodiments the IC provides a bias voltage to the second electrode and reads a signal coming from the first electrode.

A back volume 330 of the MEMS sensor depicted in FIG. 3A is bounded by the diaphragm 310, the structure 314, and the walls and surfaces (e.g., the pillars or rings) within the cavity 320. As air pressure changes outside of the back volume 330 (e.g., as a result of acoustic pressure waves), the diaphragm 310 flexes, causing the electrode 318 to move either towards or away from the IC die substrate 308, thereby changing a capacitance therebetween. This change in capacitance is represented by electrical signals that get transmitted to the circuit of the IC 306, which converts the signals into an analog or digital representation of sound or vibration.

Turning to FIG. 3B, MEMS sensor 350 is a variation on the MEMS sensor 300 of FIG. 3A. In this embodiment, the boss 316 has a cavity 336 defined therein. Possible configurations of the cavity 336 of the boss 316 include that of FIG. 1C and that of FIG. 1H.

Furthermore, instead of the cavity 320 of FIG. 3A, the IC die 304 of the MEMS sensor 350 of FIG. 3B has a cavity 370 that wraps around the central portion 110 in the IC die 304. Possible configurations of the cavity 370 include that of FIG. 1B.

A back volume 386 of the MEMS sensor 350 is bounded by the diaphragm 310, the structure 314, and the walls and surfaces (e.g., the pillars or rings) within the cavity 370 of the IC die 302 and the cavity 336 of the boss 318. As air pressure changes outside of the back volume 386 (e.g., as a result of acoustic pressure waves), the diaphragm 310 flexes, causing the first electrode 112 to move either towards or away from the IC die substrate 308, thereby changing a capacitance therebetween. This change in capacitance is represented by electrical signals that get transmitted to a circuit on the IC 306, which converts the signals into an analog or digital representation of sound or vibration.

To address the possible losses caused by diaphragm movement, an embodiment of a MEMS sensor has an IC die supported on a surface of the MEMS die by a resilient structure. The IC die in this embodiment is a rigid body that functions mechanically as a piston, and effectively takes the place of a diaphragm. A cavity is defined in the IC die such that the cavity forms at least a portion of a back volume of the microphone. Alternatively, the cavity may be defined in the MEMS die instead of in the IC die. The resilient structure resists the movement of the IC die towards the MEMS die. The resilient structure also provides a seal that prevents the lateral movement of air, which reduces noise. During operation of the MEMS sensor, a capacitance between the IC die and the MEMS die changes as a the distance between the IC die and the MEMS die changes. An IC on the IC die detects the change in capacitance and processes one or more signals representing the change.

According to an embodiment, the resilient structure includes a vent that allows pressure in the back volume to equalize with the ambient pressure (but only at non-acoustic frequencies— it is sealed at acoustic frequencies).

Figure 4A:
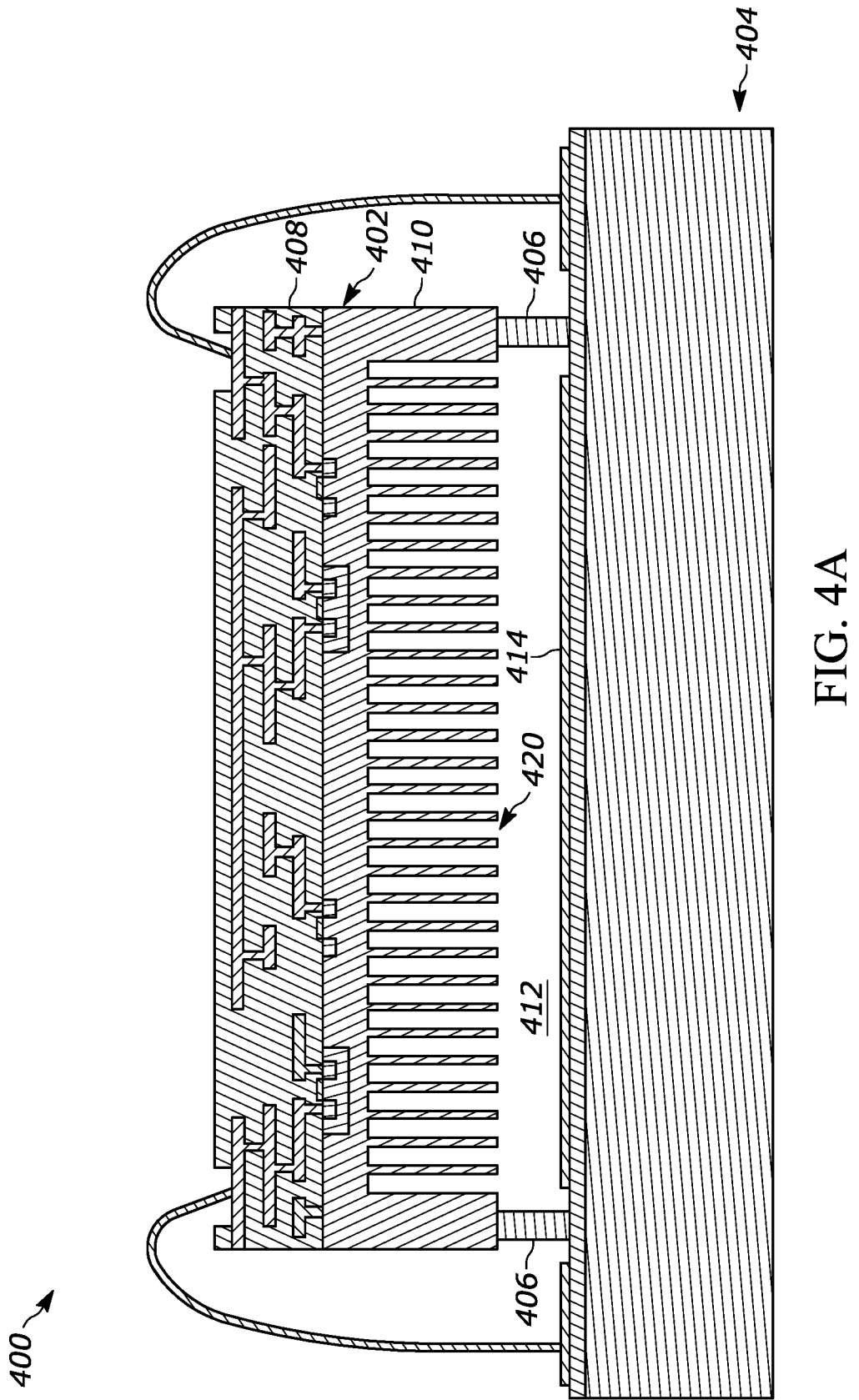
FIG. 4A is a cross-sectional view of an embodiment of a MEMS sensor that has an IC die supported on a surface of a MEMS die by a resilient structure.

Turning to FIG. 4A, a MEMS sensor configured according to such an embodiment is shown. The MEMS sensor 400 includes a piston 402 that is rigid (e.g., made of relatively thick silicon) and that is conductive (e.g., a semiconductor like crystalline silicon), a substrate 404, and a resilient structure 406 that supports the piston 402 on the substrate 404. The piston 402 in this embodiment is an IC die 402 that includes an IC 408 and an IC substrate 410. The IC substrate 410 has a cavity 420. Possible configurations of the cavity 420 include that of FIG. 1A and that of FIG. 1F.

IC die 402, substrate 404, and the resilient structure 406 enclose a back volume 412. The resilient structure 406 blocks air from leaving the back volume 412, and blocks air from travelling in a direction radially outward from a central portion of the back volume 412. The substrate 404 includes an electrode 414 that is disposed at or near a surface of the substrate 404.

The movement of the IC die 402 towards and away from the electrode 414 (which faces the IC substrate 410) results in a change in capacitance between the IC die 402 and the electrode 414 and induces a signal. The electrode 414 is connected to a bias voltage source in the IC 408 via a conductive path and the IC die 402 is connected to a circuit in the IC 408 (e.g., to an amplifier input thereof) via a conductive path.

Figure 4B:
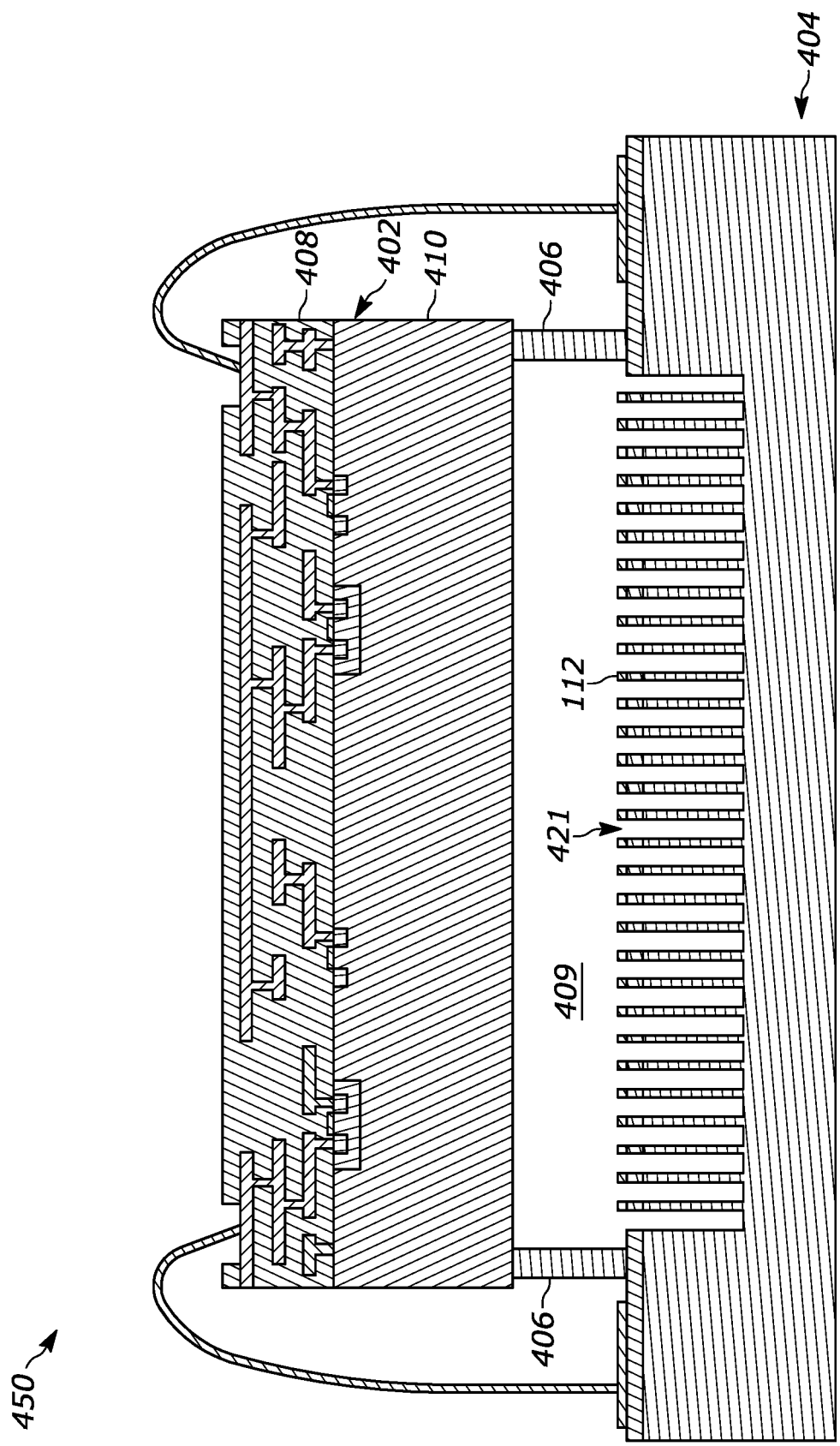
FIG. 4B is a cross-sectional view of a MEMS sensor that is a variation on the embodiment depicted in FIG. 4A.

The MEMS sensor 400 of FIG. 4A may alternatively be implemented such that the cavity (i.e., the cavity 420 of FIG. 4A) is not in the piston (the IC die 402) but instead is in the substrate 404. Such an embodiment is shown in FIG. 4B, in which a MEMS sensor 450 has a cavity 421 defined in the substrate 404. Possible configurations for the cavity 421 include that of FIG. 1C and that of FIG. 1H.

The piston (IC die) 402, surfaces of the cavity 421, and the resilient structure 406 of FIG. 4B enclose a back volume 409. The resilient structure 406 blocks air from leaving the back volume 409, and in particular blocks air from travelling in a direction radially outward from a central portion of the back volume 409.

Operation of the MEMS sensor embodiment of FIG. 4B is otherwise the same as operation of the MEMS sensor embodiment of FIG. 4A.

Figure 5A:
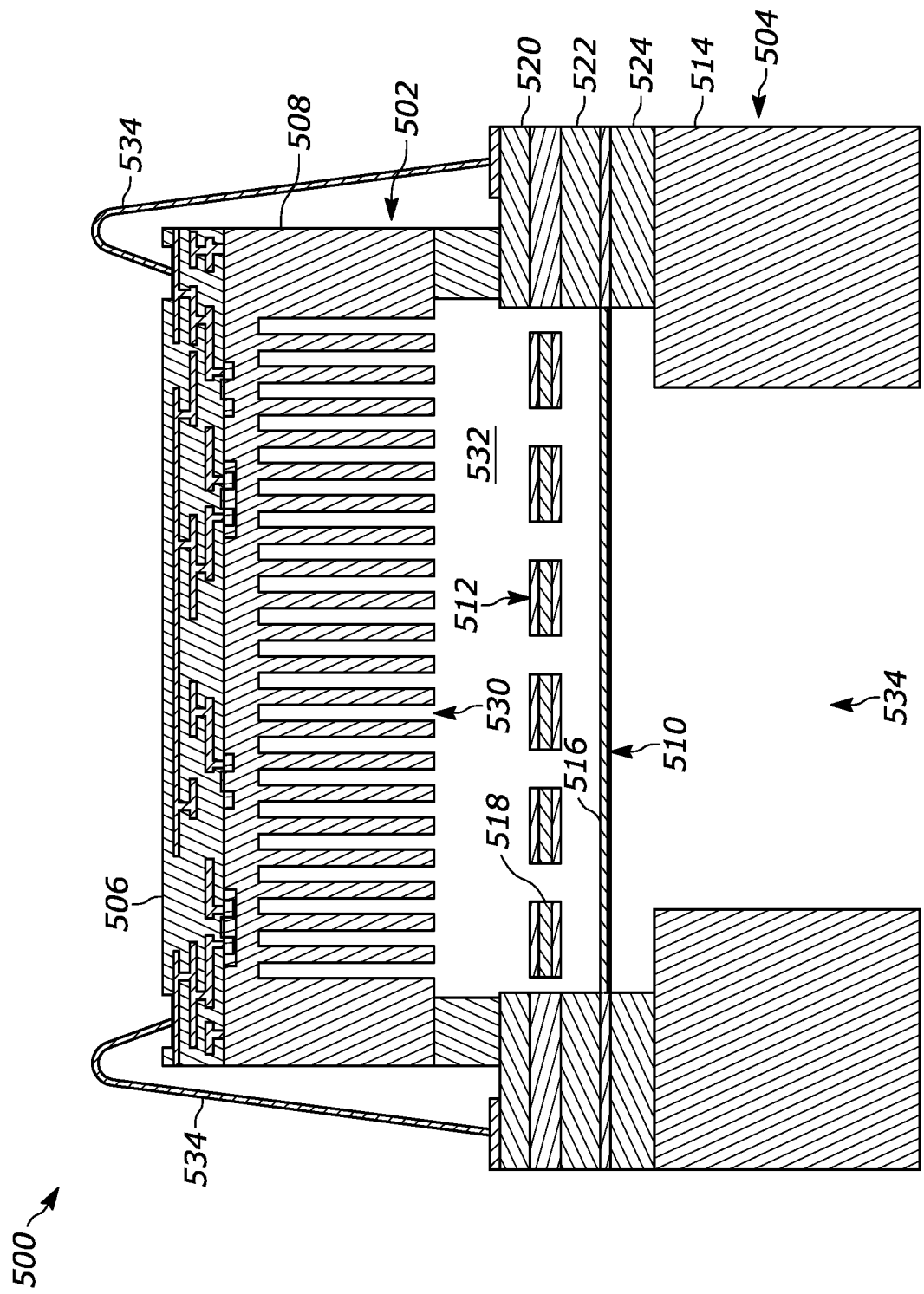
FIG. 5A is a cross-sectional view of an embodiment of a MEMS sensor that includes a MEMS die having a diaphragm and a backplate, and an IC die, in which the substrate of the IC die faces the MEMS die and has a cavity.

Some embodiments of a MEMS sensor according the present disclosure include a diaphragm and a backplate. Turning to FIG. 5A, one such embodiment is shown. The MEMS sensor 500 includes an IC die 502 and a MEMS die 504 coupled to the IC die 502. The IC die 502 includes an IC 506 and a substrate 508. The MEMS die 504 includes a diaphragm 510, a backplate 512 facing the diaphragm 510, and a substrate 514. The diaphragm 510 has a first electrode 516 and the backplate 512 has a second electrode 518. The backplate 512 is attached to the IC die 502 via a first spacer 520. The diaphragm 510 is attached to the backplate 512 via a second spacer 522 and to the substrate 514 via a third spacer 524.

In an embodiment, the first electrode 516 is electrically connected to a bias voltage source in the IC 506 and the second electrode 518 is electrically connected to a circuit of the IC 506. In other embodiments, the first electrode 516 is electrically connected to the circuit of the IC 506 and the second electrode 518 is electrically connected to the bias voltage source in the IC 506. Thus, in some embodiments the IC provides a bias voltage to the first electrode and reads a signal coming from the second electrode, and in other embodiments the IC provides a bias voltage to the second electrode and reads a signal coming from the first electrode.

The IC substrate 508 has a cavity 530. Possible configurations of the cavity 530 include that of FIG. 1A and that of FIG. 1F.

A back volume 532 of the MEMS sensor depicted in FIG. 5A is bounded by the diaphragm 510, the spacers 520 and 522, and the walls and surfaces (e.g., the pillars or rings) within the cavity 530. As air pressure changes outside of the back volume 532 (e.g., as a result of acoustic pressure waves entering a hole 534 of the MEMS die substrate 514), the diaphragm 510 flexes, causing the first electrode 516 to move either towards or away from the second electrode 518, thereby changing a capacitance therebetween. This change in capacitance is represented by electrical signals that get transmitted to the IC 506, which converts the signals into an analog or digital representation of sound or vibration.

Figure 5B:
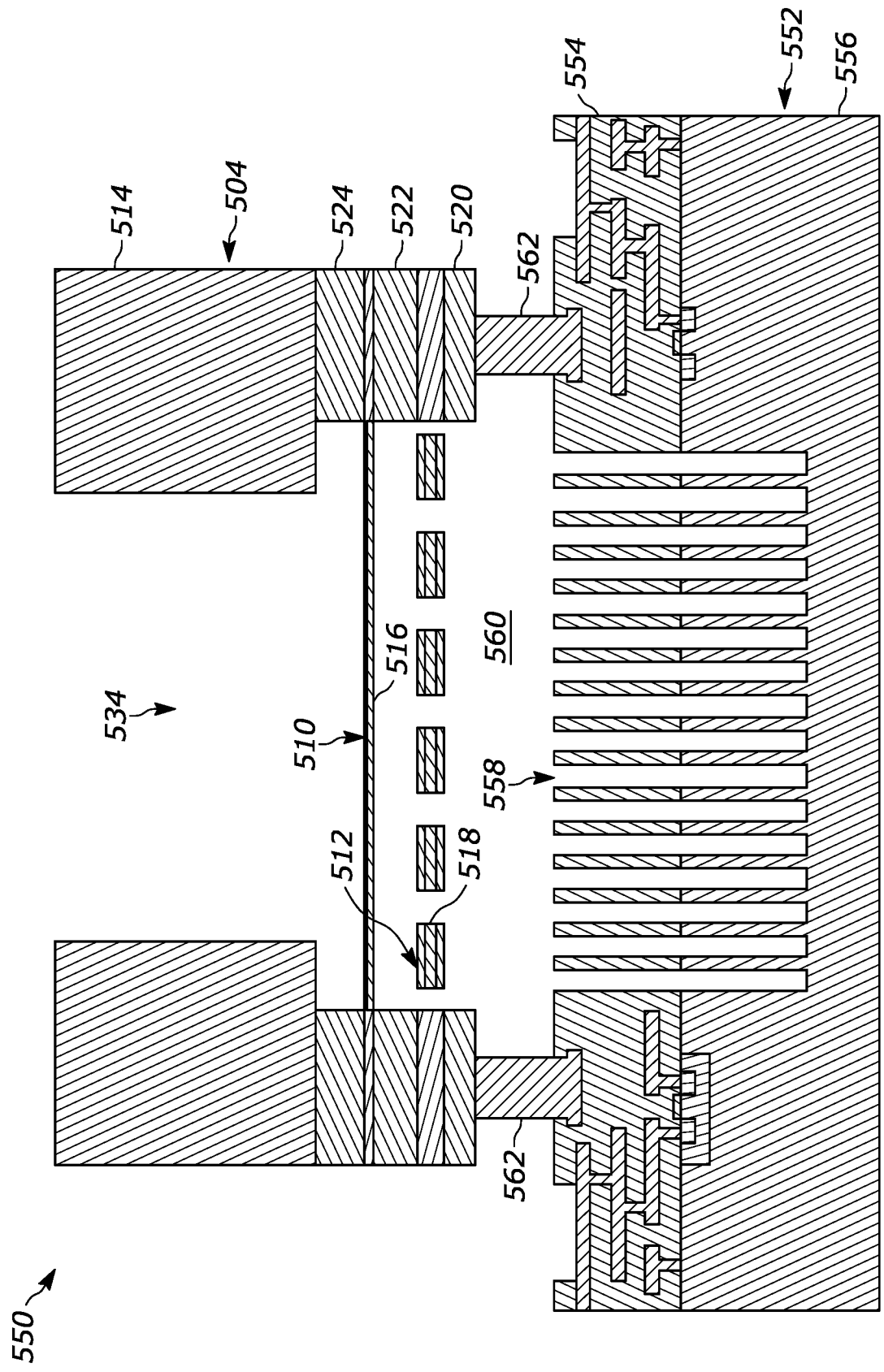
FIG. 5B is a cross-sectional view of a MEMS sensor that includes a MEMS die having a diaphragm and a backplate, and an IC die having a cavity, in which the IC faces the MEMS die.

In a variation on the embodiment of FIG. 5A, the MEMS sensor 550 of FIG. 5B has an IC die 552 includes an IC 554 and a substrate 556. The IC die 552 has a cavity 558, that extends through the IC 554 as well as through the substrate 556. In contrast to the embodiment of FIG. 5A, the embodiment of FIG. 5B has the IC die 552 oriented so that its IC 554 faces towards the MEMS die 504. The MEMS die 504 is therefore depicted in FIG. 5B with an orientation that is reversed from FIG. 5A. Possible configurations of the cavity 558 include that of FIG. 1A and that of FIG. 1F. A back volume 560 is bounded by the diaphragm 510, the spacers 520 and 522, and the walls and surfaces (e.g., the pillars or rings) within the cavity 558.

In contrast to the embodiment of FIG. 5A, the IC 554 of FIG. 5B is electrically connected to the MEMS die 504 via a stucture 562 (e.g., a eutectic metal contact). The operation of the MEMS sensor 550 of FIG. 5B is otherwise the same as that of the MEMS sensor 500 of FIG. 5A. As air pressure changes outside of the back volume 560, the diaphragm 510 flexes, causing the first electrode 516 to move either towards or away from the second electrode 518, thereby changing a capacitance therebetween. This change in capacitance is represented by electrical signals that get transmitted to the IC 554, which converts the signals into an analog or digital representation of sound or vibration.

Figure 5C:
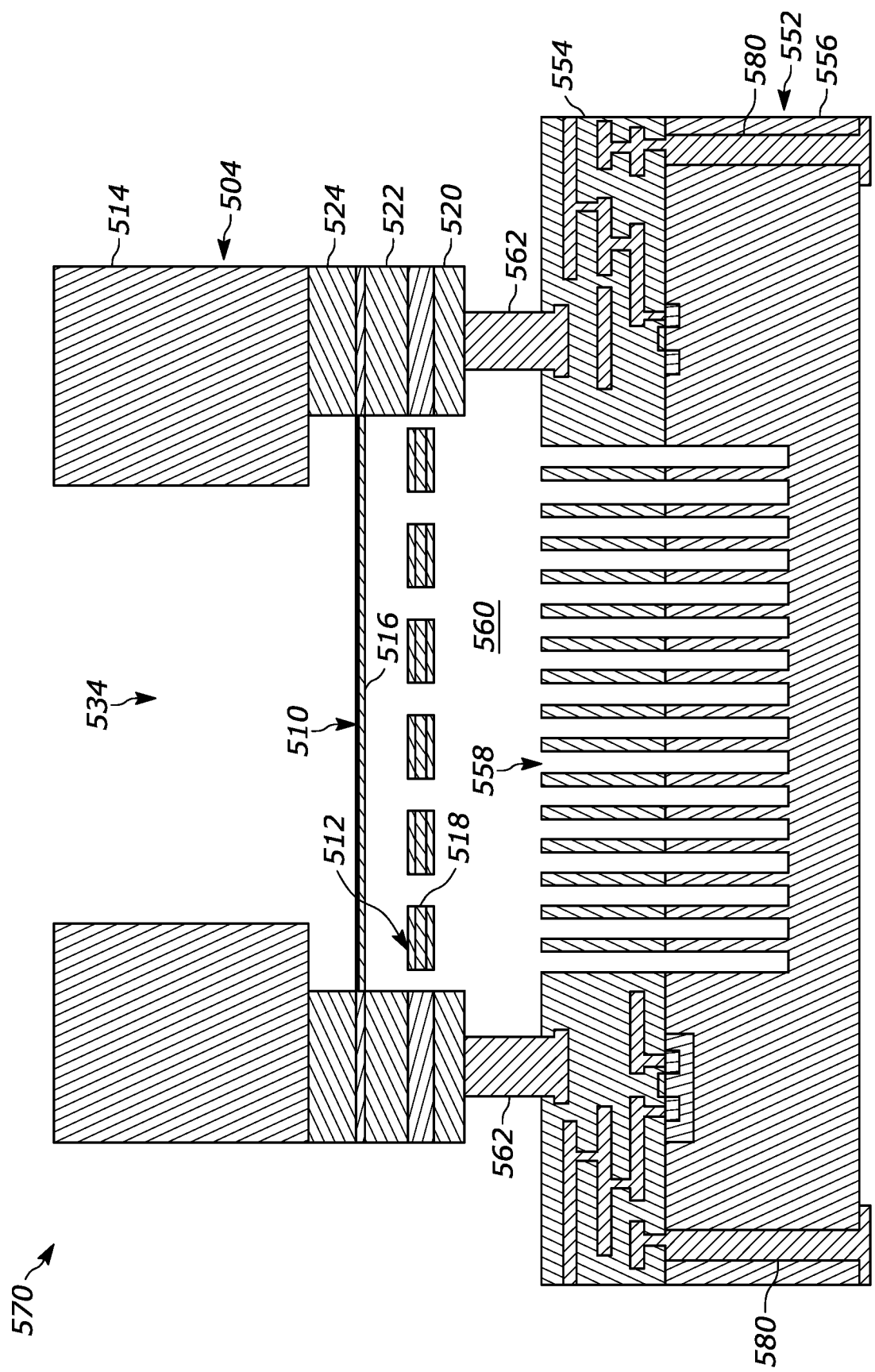
FIG. 5C is a cross-sectional view of a MEMS sensor that is the same as the MEMS sensor of FIG. 5B except that is has through-silicon vias that run from the IC, through the substrate of the IC die, and to an exterior of the MEMS sensor.

In a variation on the embodiment of FIG. 5B, in FIG. 5C (MEMS sensor 570) the IC 554 is electrically connected other components external to the MEMS sensor via TSVs 580. Operation of the MEMS sensor 570 is otherwise the same as that of the MEMS sensor 500 of FIG. 5A and the MEMS sensor 550 of FIG. 5B.

Figure 6A:
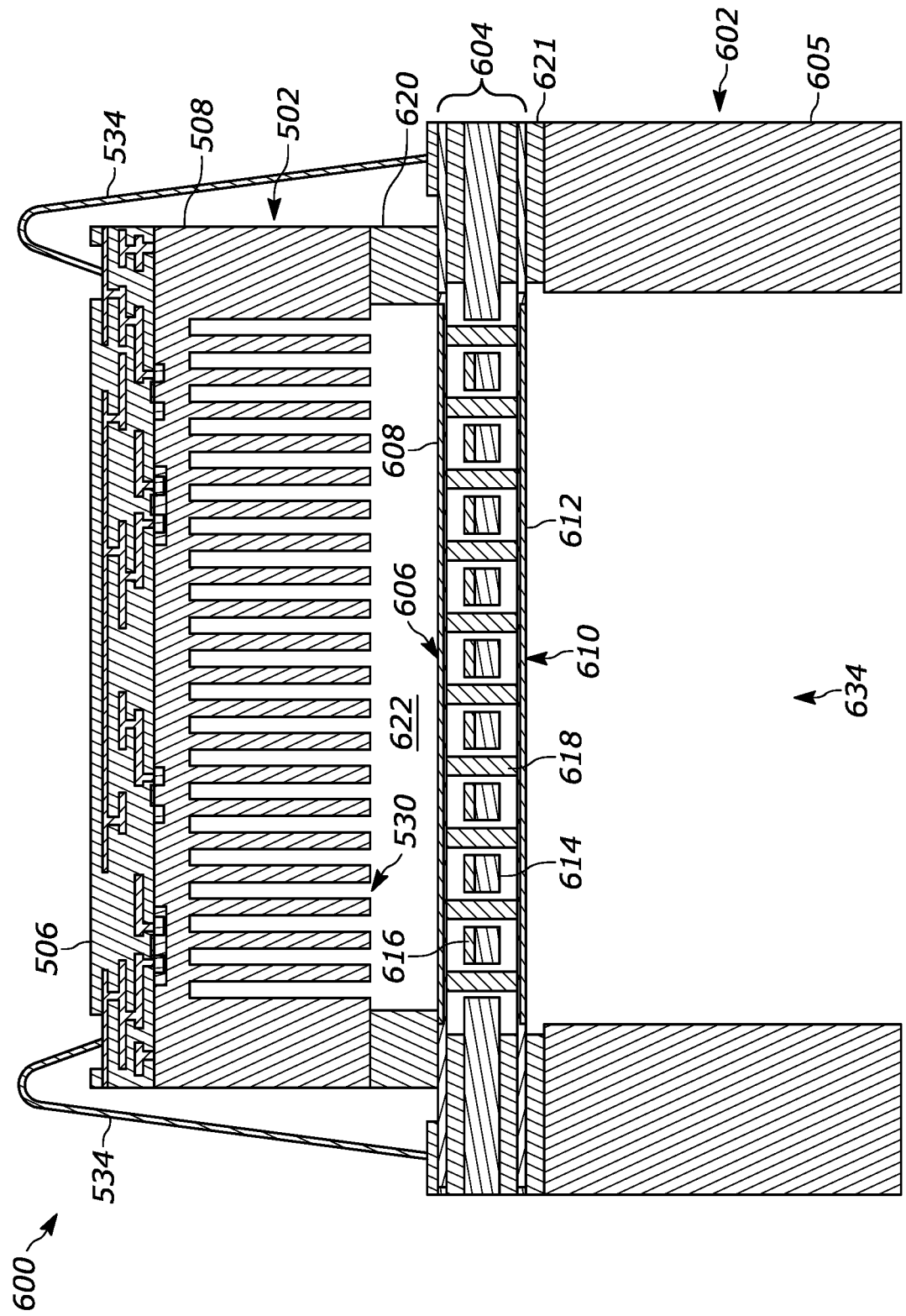
FIG. 6A is a cross-sectional view of an embodiment of a MEMS sensor that includes a MEMS die having two diaphragms and a backplate, and an IC die, in which the substrate of the IC die faces the MEMS die and has a cavity.
Figure 6B:
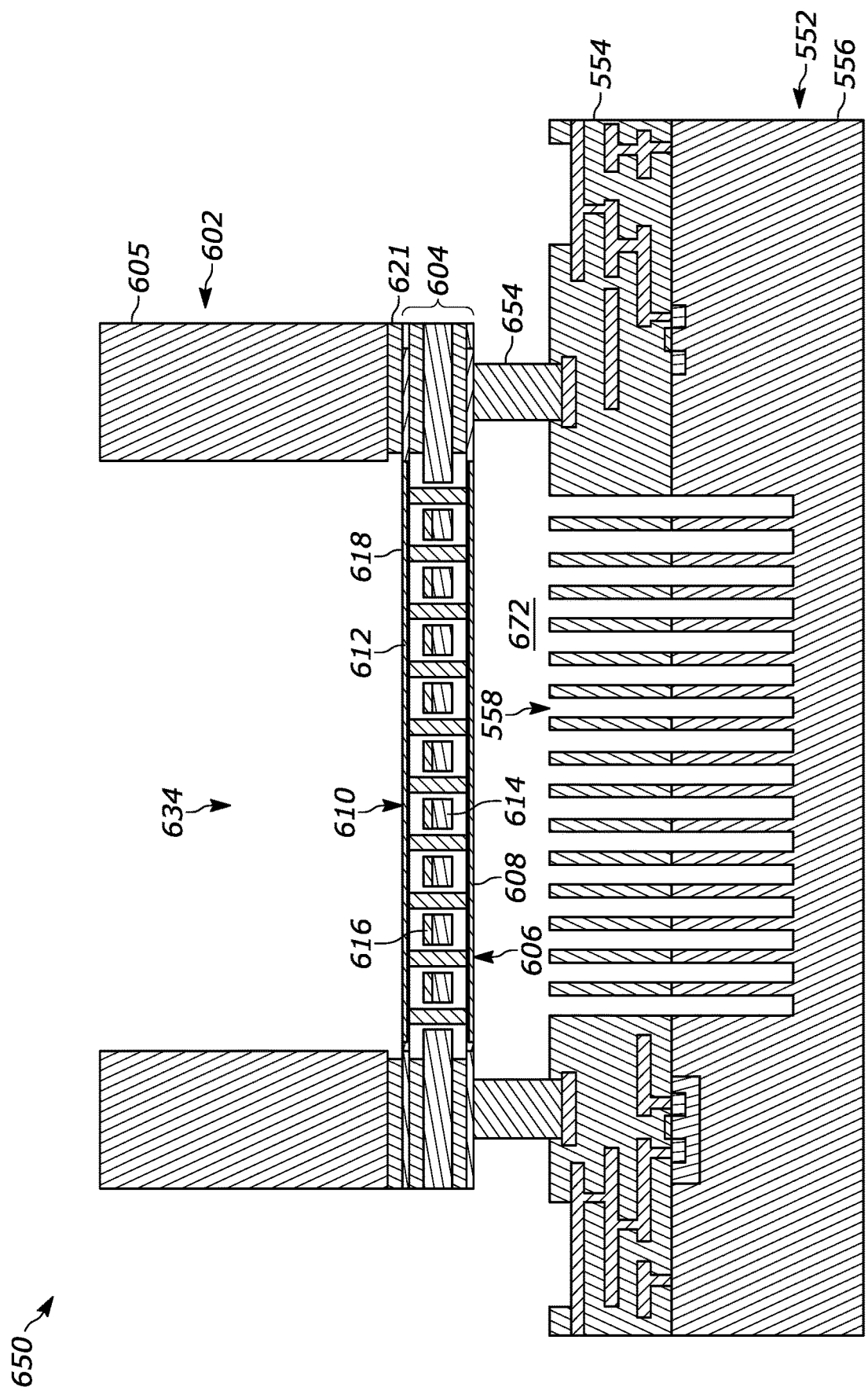
FIG. 6B is a cross-sectional view of an embodiment of a MEMS sensor that includes a MEMS die having two diaphragms and a backplate, and an IC die in which the IC faces the MEMS die and has a cavity.
Figure 6C:
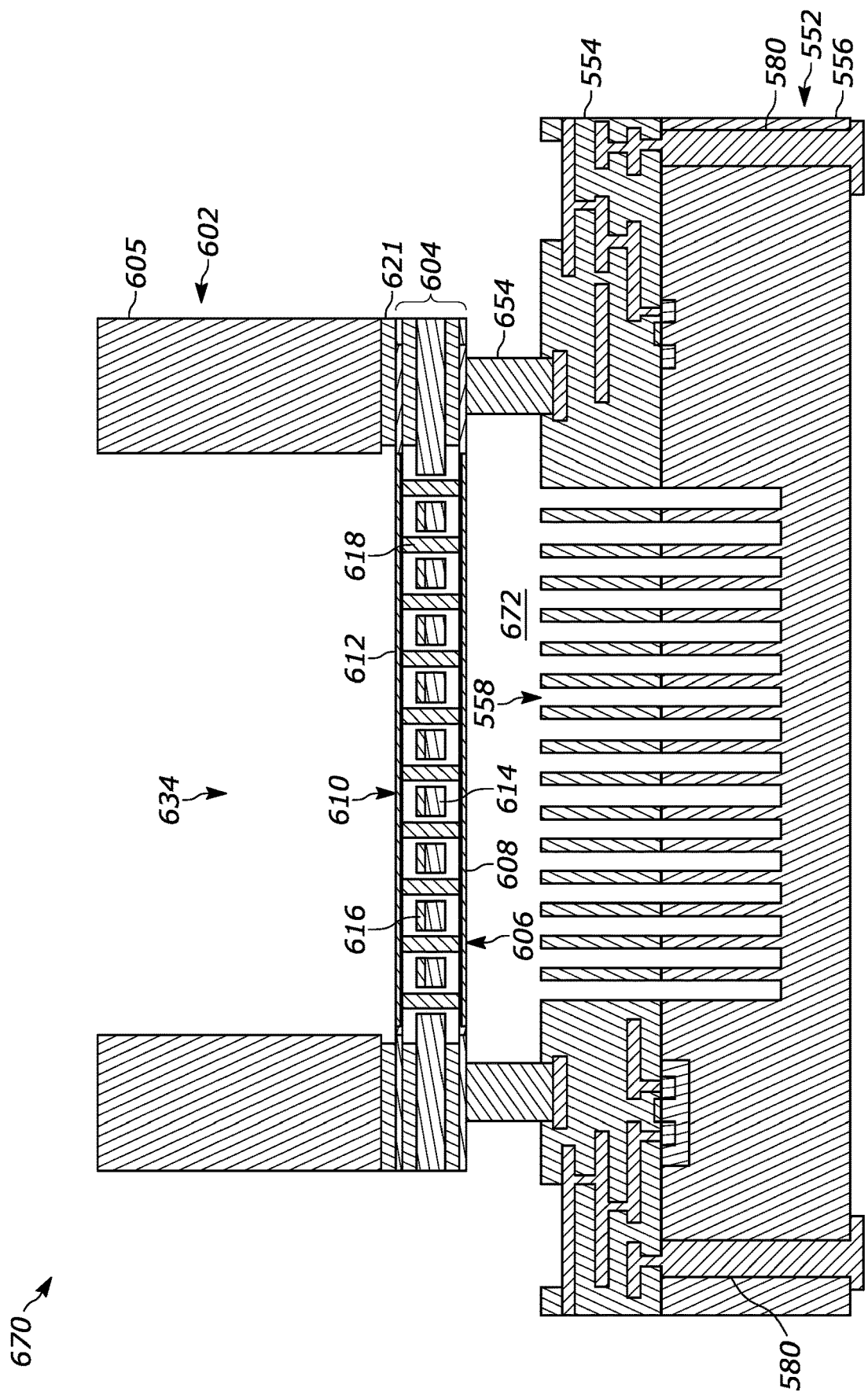
FIG. 6C is a cross-sectional view of a MEMS sensor that is the same as the MEMS sensor of FIG. 6B except that is has through-silicon vias that run from the IC, through the substrate of the IC die, and to an exterior of the MEMS sensor.

Other variations of the embodiments of FIG. 5A, FIG. 5B, and FIG. 5C are shown in FIG. 6A, FIG. 6B, and FIG. 6C. In these embodiments, the respective IC dies (IC die 502 of FIG. 5A and IC die 552 of FIG. 5B and FIG. 5C) are coupled to a MEMS die 602 having a dual-diaphragm assembly 604. The dual-diaphragm assembly 604 includes a first diaphragm 606 comprising a first electrode 608, a second diaphragm 610 comprising a second electrode 612, and a backplate 614 comprising a third electrode 616. The first diaphragm 606 and the second diaphragm 610 are oriented so that they face one another, and the backplate 614 is disposed in between the first diaphragm 606 and the second diaphragm 610 and facing both the first diaphragm 606 and the second diaphragm 610. The first diaphragm 606 and the second diaphragm 610 are connected to one another by pillars 618, which extend through holes in the backplate 614.

In the embodiment of FIG. 6A, the dual-diaphragm assembly 604 (and thus the MEMS die 602 as a whole) is coupled to the IC die 502 via a spacer 620. The dual-diaphragm assembly 604 is coupled to a substrate 605 of the MEMS die 602 via a spacer 621. A back volume 622 is bounded by the first diaphragm 606, the spacer 620, and the surfaces of the cavity 530 (e.g., pillars, rings, back inner surface).

In contrast to the embodiment of FIG. 6A, in the embodiments of FIG. 6B and FIG. 6C (MEMS sensors 650 and 670), the dual-diaphragm assembly 604 (and thus the MEMS die 602 as a whole) is coupled to the IC die 552 via a structure 654 (e.g., a eutectic metal contact). A back volume 672 is bounded by the first diaphragm 606, the structure 654, and the walls and surfaces (e.g., the pillars or rings) of the cavity 558.

In the MEMS sensors 650 and 670 of FIG. 6B and FIG. 6C, the IC 554 is electrically connected to the MEMS die 602 via the structure 654. The MEMS sensor 670 of FIG. 6C differs from the MEMS sensor 650 of FIG. 6B in that the IC 554 is electrically connected to other components external to the MEMS sensor via TSVs 580. Operation of the MEMS sensor 670 is otherwise the same as that of the MEMS sensor 600 of FIG. 6A and the MEMS sensor 650 of FIG. 6B.

Each of the embodiments FIG. 6A, FIG. 6B, and FIG. 6C operates as follows. As air pressure changes outside of the back volume (e.g., as a result of acoustic pressure waves entering a hole of the MEMS die substrate), the first or second diaphragm moves, causing the electrode on the diaphragm to move either towards or away from the electrode on the backplate (the third electrode), which also causes the opposite diaphragm and its electrode to move in the opposite direction relative to the backplate electrode, thereby changing a capacitance between each of the diaphragm electrodes and the backplate electrode. This dual change in capacitance is represented by electrical signals that get transmitted to the IC 554, which converts the signals into an analog or digital representation of sound or vibration.

Figure 7:
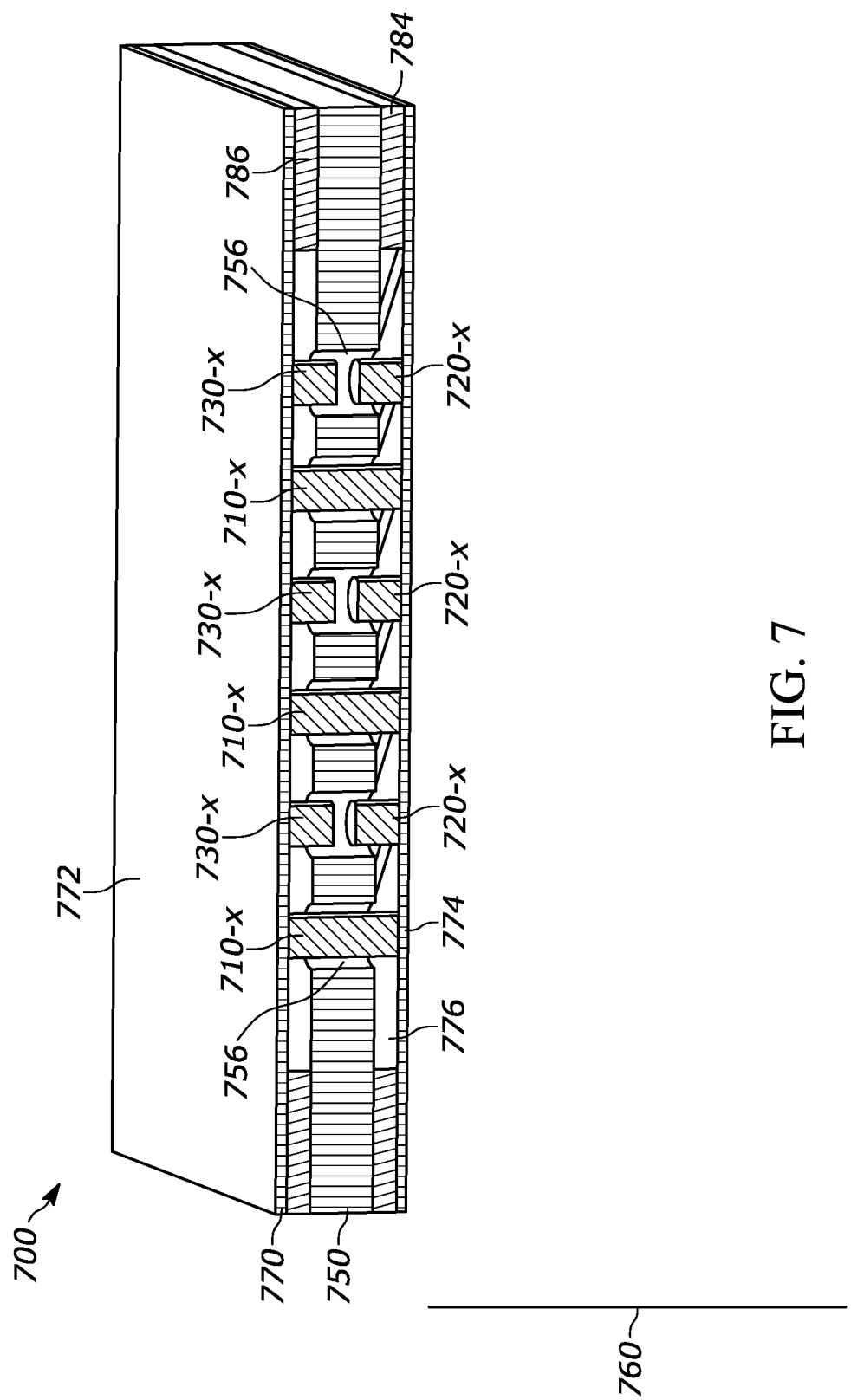
FIG. 7 is a sectional, perspective view of dual-diaphragm, solid-dielectric assembly, according to an embodiment.

Turning to FIG. 7, another type of dual-diaphragm assembly that may be used in place of the dual diaphragm assembly 604 (of FIG. 6A, FIG. 6B, and FIG. 6C) is shown. The dual-diaphragm, solid-dielectric assembly 700 of FIG. 7 includes a first diaphragm 770 coupled to a first set of electrodes 710-$x$ and a third set of electrodes 730-$x$. The first diaphragm 770 has a surface 772 perpendicular to an axis 760. The surface 772 is substantially planar (e.g., planar but with imperfections on the surface 772 or slightly curved or uneven while still allowing the surface 772 to operate in a manner useful for a diaphragm). The diaphragm 770 may be made of sandwiched layers. The dual-diaphragm assembly 700 also includes a second diaphragm 774 located on an opposite side of the dielectric 750 from the first diaphragm 770. The second diaphragm 774 is coupled to the first set of electrodes 710-$x$ and the second set of electrodes 720-$x$. The second diaphragm 774 has substantially planar surface 776 and is oriented perpendicular to the axis 760. The first diaphragm 770 and the second diaphragm 774 are spaced from the dielectric 750 to permit relative movement between the electrodes connected to the first and second diaphragms and the dielectric 750.

In an embodiment, a sealed low-pressure region is defined between the diaphragms 770 and 774. This low-pressure region serves to reduce noise and damping of the assembly 700. The first set of electrodes 710-$x$ (which are connected to both the first diaphragm 770 and the second diaphragm 774) help prevent the diaphragms from collapsing onto the dielectric 750. This low-pressure region may be substantially a vacuum (e.g., with a pressure less than 1 Torr, less than 300 mTorr, or less than 100 mTorr). According to an embodiment, the dielectric 750 is relatively thick and stiff compared to the diaphragms 770 and 774 and remains relatively motionless when the diaphragms 770 and 774 are deflected. Deflection of the diaphragms 770 and 774 moves the electrodes 710-$x$, 720-$x$, and 730-$x$ relative to the dielectric 750

The diaphragms 770 and 774 may be made of a dielectric material, such as silicon nitride. However, other materials can be used. For example, one or more of the diaphragm 770, the diaphragm 774, and the dielectric 750 can be polyimide.

Figure 8A:
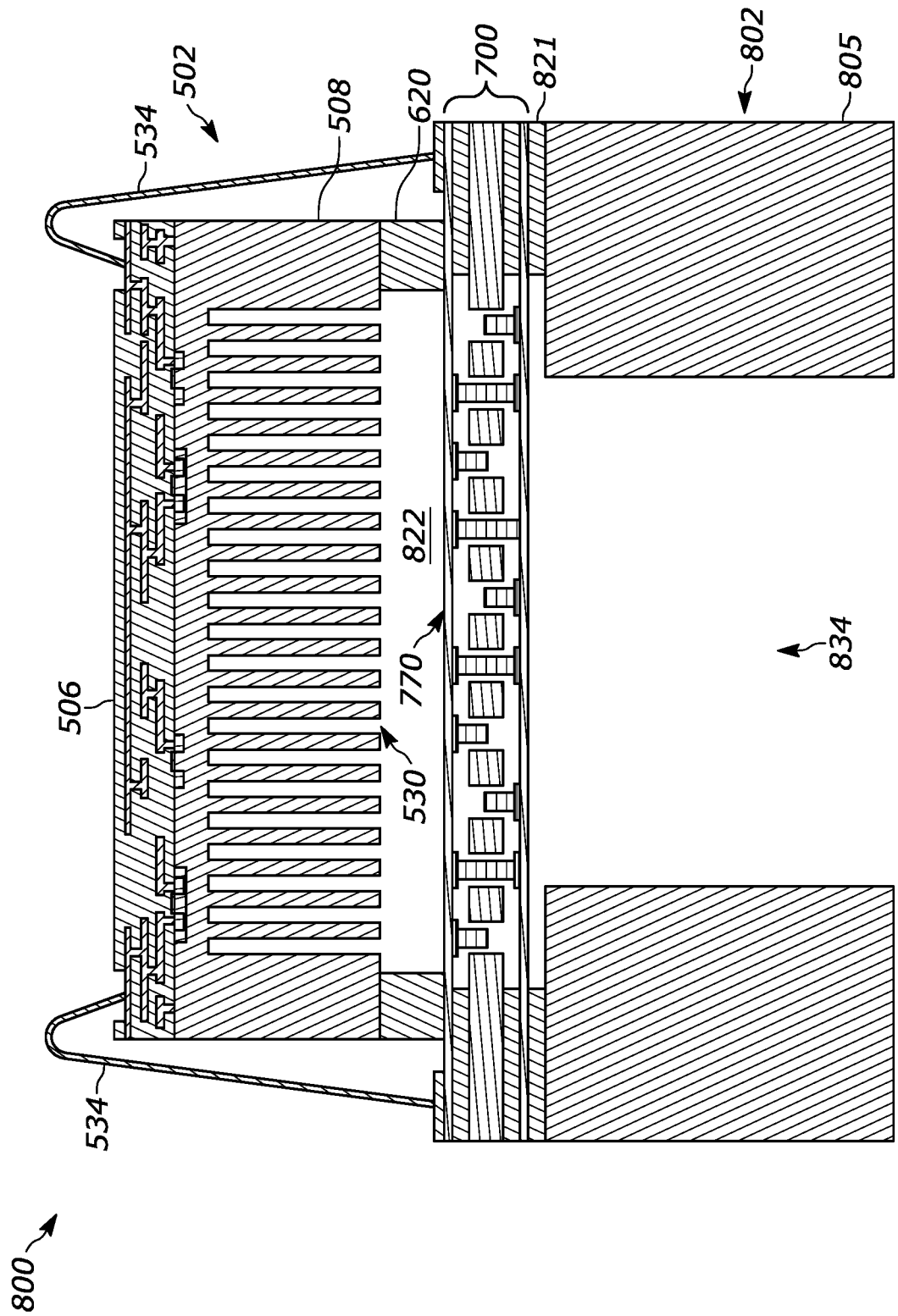
FIG. 8A is a cross-sectional view of an embodiment of a MEMS sensor that includes a MEMS die having the dual-diaphragm, solid-dielectric assembly of FIG. 7 and an IC die, in which the substrate of the IC die faces the MEMS die and has a cavity.
Figure 8B:
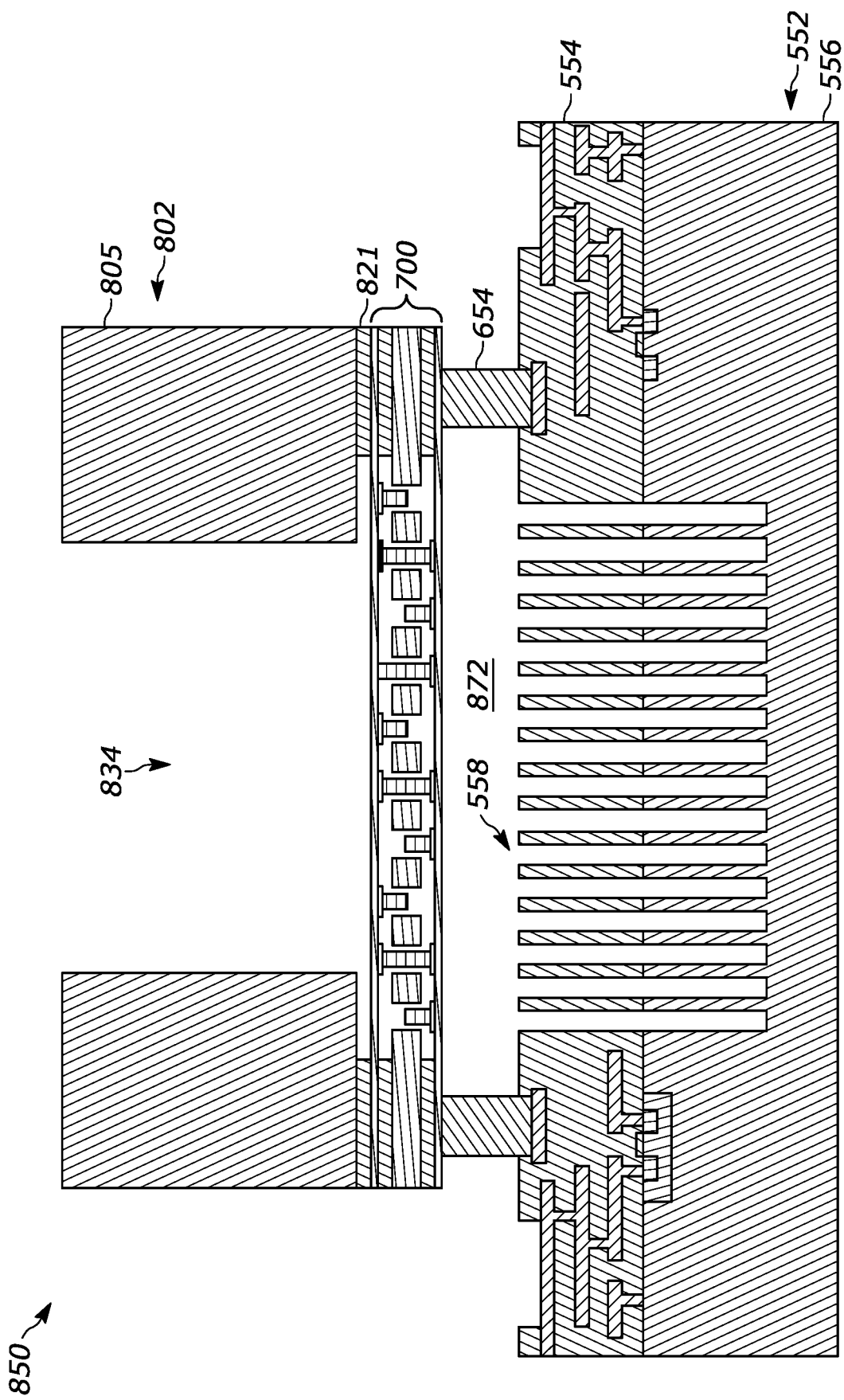
FIG. 8B is a cross-sectional view of an embodiment of a MEMS sensor that includes a MEMS die having the dual-diaphragm, solid-dielectric assembly of FIG. 7, and an IC die having a cavity, in which an IC on the IC die faces the MEMS die.
Figure 8C:
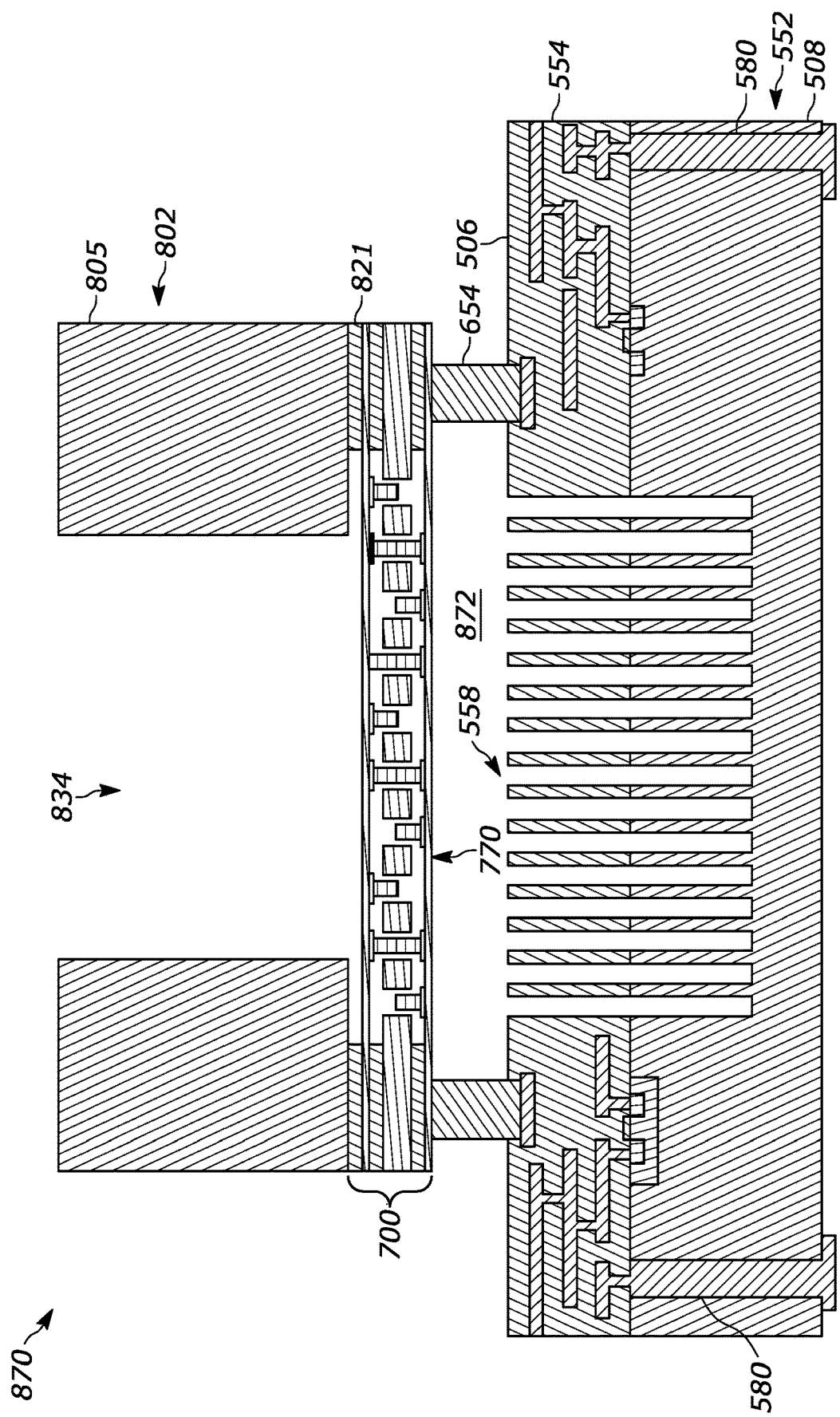
FIG. 8C is a cross-sectional view of a MEMS sensor that is the same as the MEMS sensor of FIG. 8B except that is has through-silicon vias that run from the IC, through the substrate of the IC die, and to an exterior of the MEMS sensor.

Variations of the embodiments of FIG. 6A, FIG. 6B, and FIG. 6C are shown in FIG. 8A, FIG. 8B, and FIG. 8C, in which a dual-diaphragm, solid-dielectric assembly 700 is used in place of the dual-diaphragm assembly 604. In these embodiments, the respective IC dies (IC die 502 and IC die 552) are coupled to a MEMS die 802 that uses the dual-diaphragm, solid-dielectric assembly 700.

In the embodiment of FIG. 8A (MEMS sensor 800), the dual-diaphragm, solid-dielectric assembly 700 (and thus the MEMS die 802 as a whole) is coupled to the IC die 502 via the spacer 620, and is coupled to a substrate 805 of the MEMS die 802 via a spacer 821. A back volume 822 is bounded by the first diaphragm 770, the spacer 620, and the surfaces of the cavity 530 (e.g., pillars, rings, back inner surface).

In contrast to the embodiment of FIG. 8A, in the embodiments of FIG. 8B and FIG. 8C (MEMS sensors 850 and 870), the dual-diaphragm, solid-dielectric assembly 700 (and thus the MEMS die 802 as a whole) is coupled to the IC die 552 via a structure 654 (e.g., a eutectic metal contact). A back volume 872 is bounded by the first diaphragm 770, the structure 654, and the walls and surfaces (e.g., the pillars or rings) of the cavity 558.

In the MEMS sensors 850 and 870, the IC 554 is electrically connected to the MEMS die 802 via the structure 654. The MEMS sensor 870 of FIG. 8C differs from the MEMS sensor 850 of FIG. 8B in that the IC 554 is electrically connected to other components external to the MEMS sensor via TSVs 580. Operation of the MEMS sensor 870 is otherwise the same as that of the MEMS sensor 800 of FIG. 8A and the MEMS sensor 850 of FIG. 8B.

Each of the MEMS sensors 800, 850, and 870 of FIG. 8A, FIG. 8B, and FIG. 8C operates as follows. Pressure (e.g., from sound waves) reaches at least one of the diaphragms via a hole 834 in the MEMS die substrate 805, causing the diaphragm(s) to flex and to move the electrodes attached thereto relative to the dielectric, thereby causing respective capacitances between the various elements to change. This change in capacitance manifests as a change in one or more signals being output from the dual-diaphragm, solid-dielectric assembly 700. The one or more signals are read out by the IC 554 via attached bond wires 534 (FIG. 8A) or via structures 654 (FIG. 8B and FIG. 8C) and passed on to other external components by the IC (e.g., via the TSVs 580 of FIG. 8C).

Figure 9A:
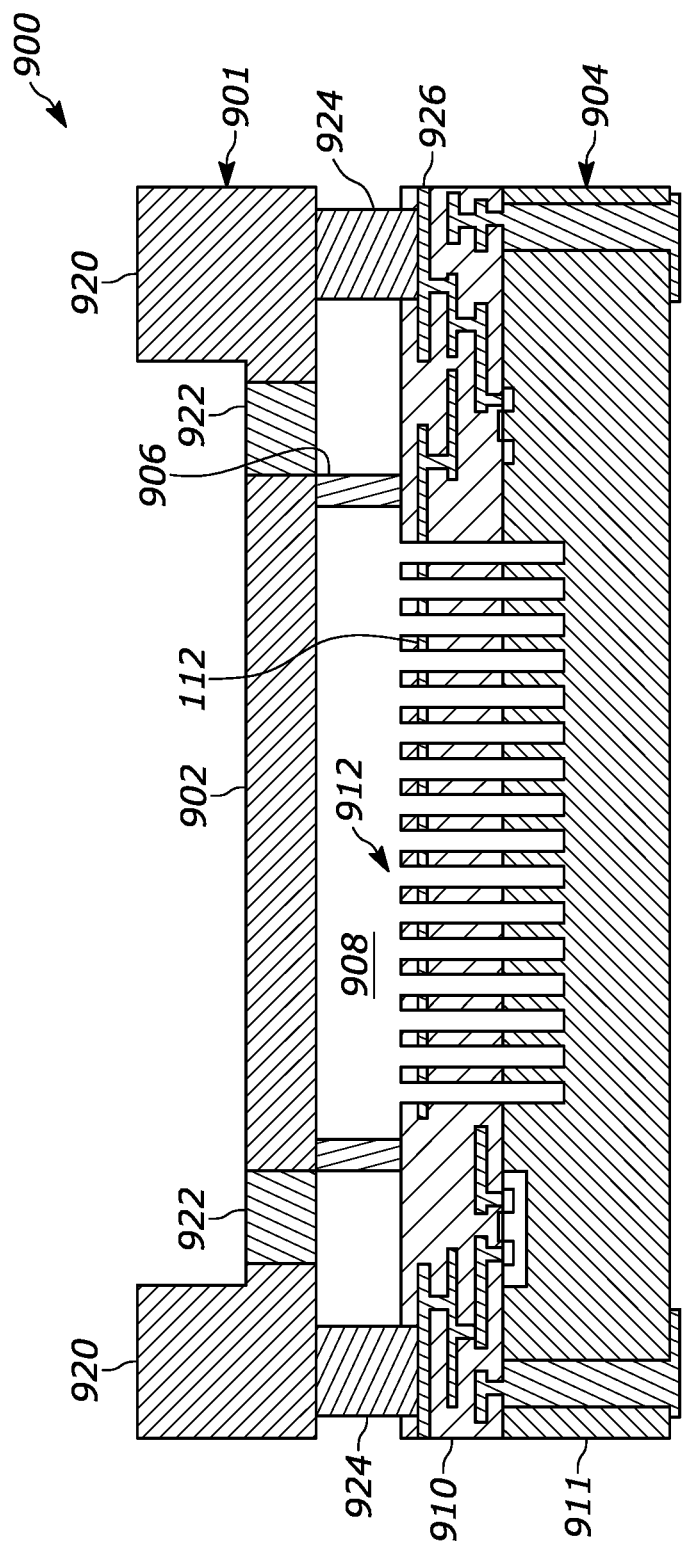
FIG. 9A is a side cross-sectional view of a MEMS die having a movable piston, according to an embodiment.

Turning to FIG. 9A, a MEMS sensor configured according to still another embodiment is shown. The MEMS sensor 900 includes a MEMS die 901 having a piston 902 that is rigid (e.g., made of relatively thick silicon) and conductive (e.g., made of a conductive material such as a metal or a doped semiconductor (such as crystalline silicon)). The MEMS sensor 900 further includes an IC die 904, and a resilient structure 906 that supports the piston 902 on the IC die 904. Possible implementations of the piston 902 and the resilient structure 906 include those discussed in conjunction with piston and resilient structures of FIG. 4A and FIG. 4B. A back volume 908 is bounded on top by the piston 902, bounded on the bottom by the IC die 904, and bounded on all sides by the resilient structure 906. In other words, the piston 902, IC die 904, and the resilient structure 906 enclose the back volume 908. The resilient structure 906 prevents air from leaving the back volume 908, and in particular blocks air from travelling in a direction radially outward from a central portion of the back volume 908. The IC die 904 includes an IC 910 and a substrate 911. A cavity 912 is formed in the IC die 904. The cavity 912 extends into the IC 910 and, in the illustrated embodiment, into the substrate 911. Possible configurations of the cavity 912 include those depicted and described with respect to FIG. 1D and FIG. 1H.

The electrode 112 faces the piston 902 such that a capacitance exists between the piston 902 and the electrode 112 (with the piston 902 acting as a first electrode of a capacitor, the electrode 112 acting as a second electrode of the capacitor, and the air or other gas in the back volume 908 acting as the dielectric). However, in some embodiments, the piston 902 includes both insulative material and a conductive portion or layer, in which the conductive portion or layer acts as the first electrode of the capacitor.

In an embodiment, the piston 902 is electrically connected to a bias voltage source in the IC 910 and the electrode 112 is electrically connected to a circuit of the IC 910 (e.g., to an amplifier input thereof). Alternatively, the piston 902 may be electrically connected to the circuit of the IC 910 and the electrode 112 may be electrically connected to the bias voltage source of the IC 910. Thus, in some embodiments the IC provides a bias voltage to the piston and reads a signal coming from the electrode, and in other embodiments the IC provides a bias voltage to the electrode and reads a signal coming from the piston.

Figure 9B:
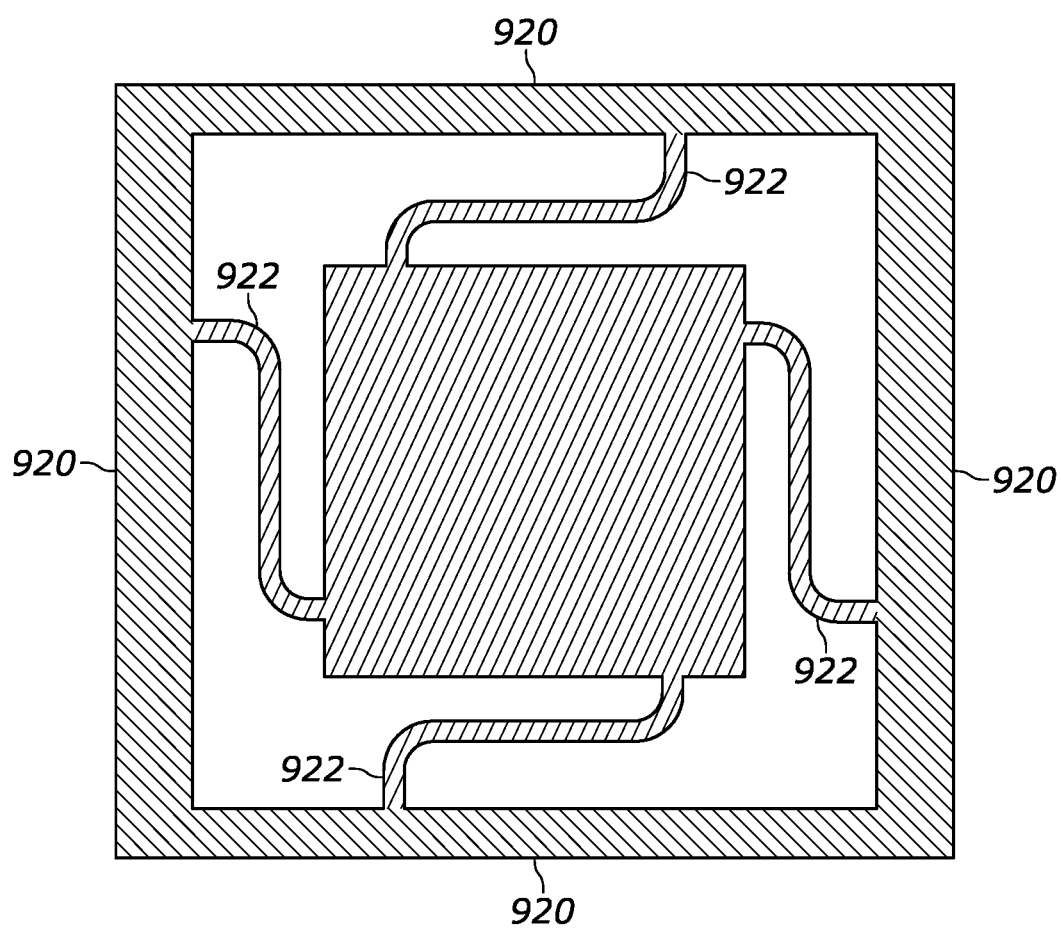
FIG. 9B is a top view of the piston, walls, and external conductors of a possible implementation of the MEMS die of FIG. 9A.

According to an embodiment, the MEMS die 901 includes walls 920 and one or more external conductors 922. Each external conductor 922 is electrically connected to the piston 902 (or to an electrode on the piston 902 if the piston includes insulative material) at one end and to a wall 920 at the other end. In an embodiment, each of the one or more external conductors 922 is a resilient member, such as a metallic spring. The walls 920 are connected to the bias voltage source of the IC 910 by way of a structure 924 (e.g., a eutectic metal contact) and a conductive path 926 within the IC die 904 (with through-silicon vias (TSVs) as appropriate). FIG. 9B depicts the walls 920 and the external conductors 922 as seen from above the piston 902.

Figure 9C:
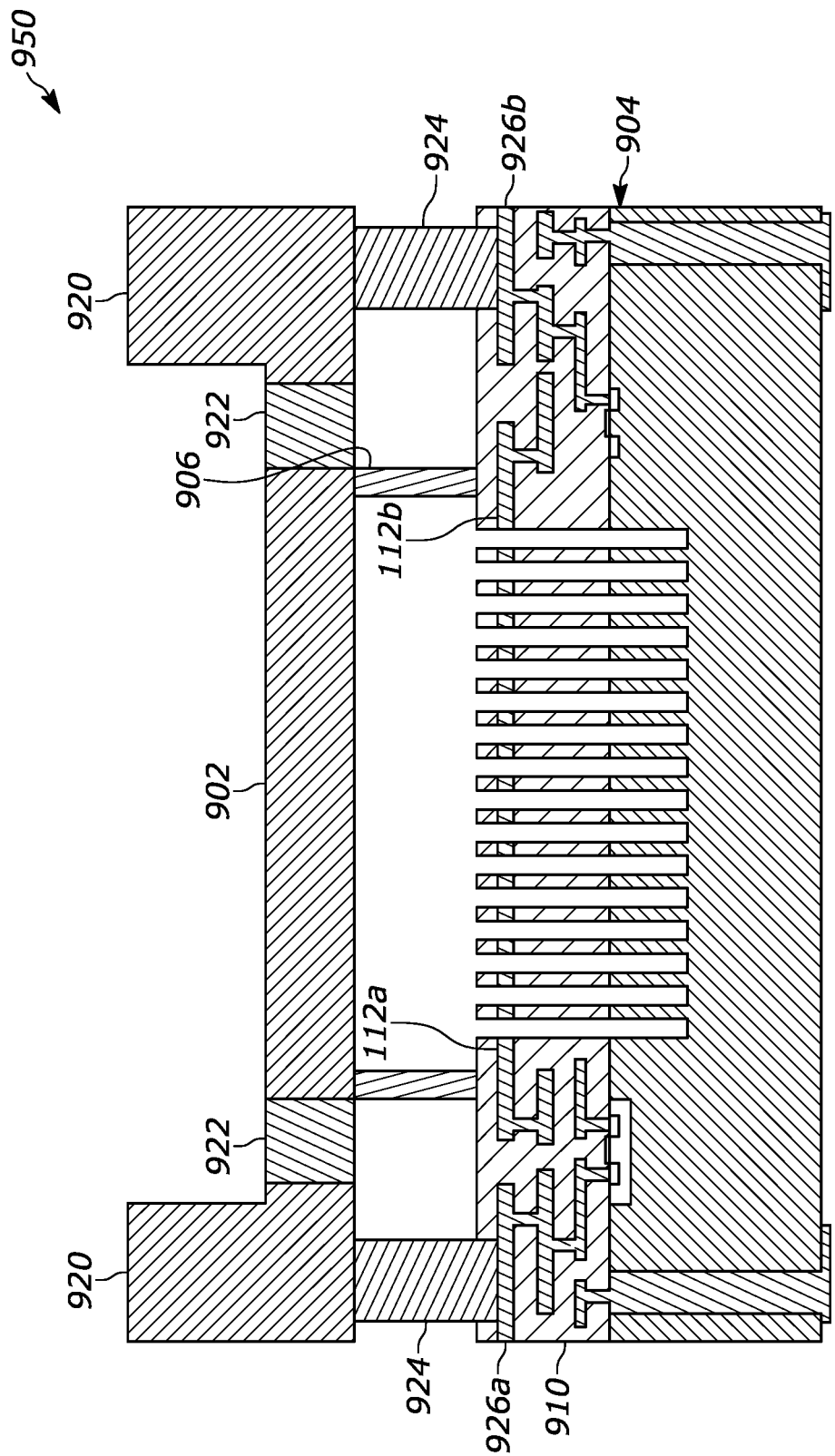
FIG. 9C is a side cross-sectional view of a MEMS die that is a variation of the MEMS die of FIG. 9A.

In a variation on the embodiment described in conjunction with FIG. 9A, the function of the electrode 112 may be carried out by two electrodes, shown in the MEMS sensor 950 of FIG. 9C. In this embodiment, the function of the electrode 112 is carried out by an electrode 112a and an electrode 112b, both of which are depicted as being embedded in the IC 910. In this embodiment, the electrode 112a is electrically connected to the bias voltage source in the IC 910 via a conductive path 926a and the electrode 112b is electrically connected to a circuit of the IC 910 (e.g., to an amplifier input thereof) via a conductive path 926b.

Figure 9D:
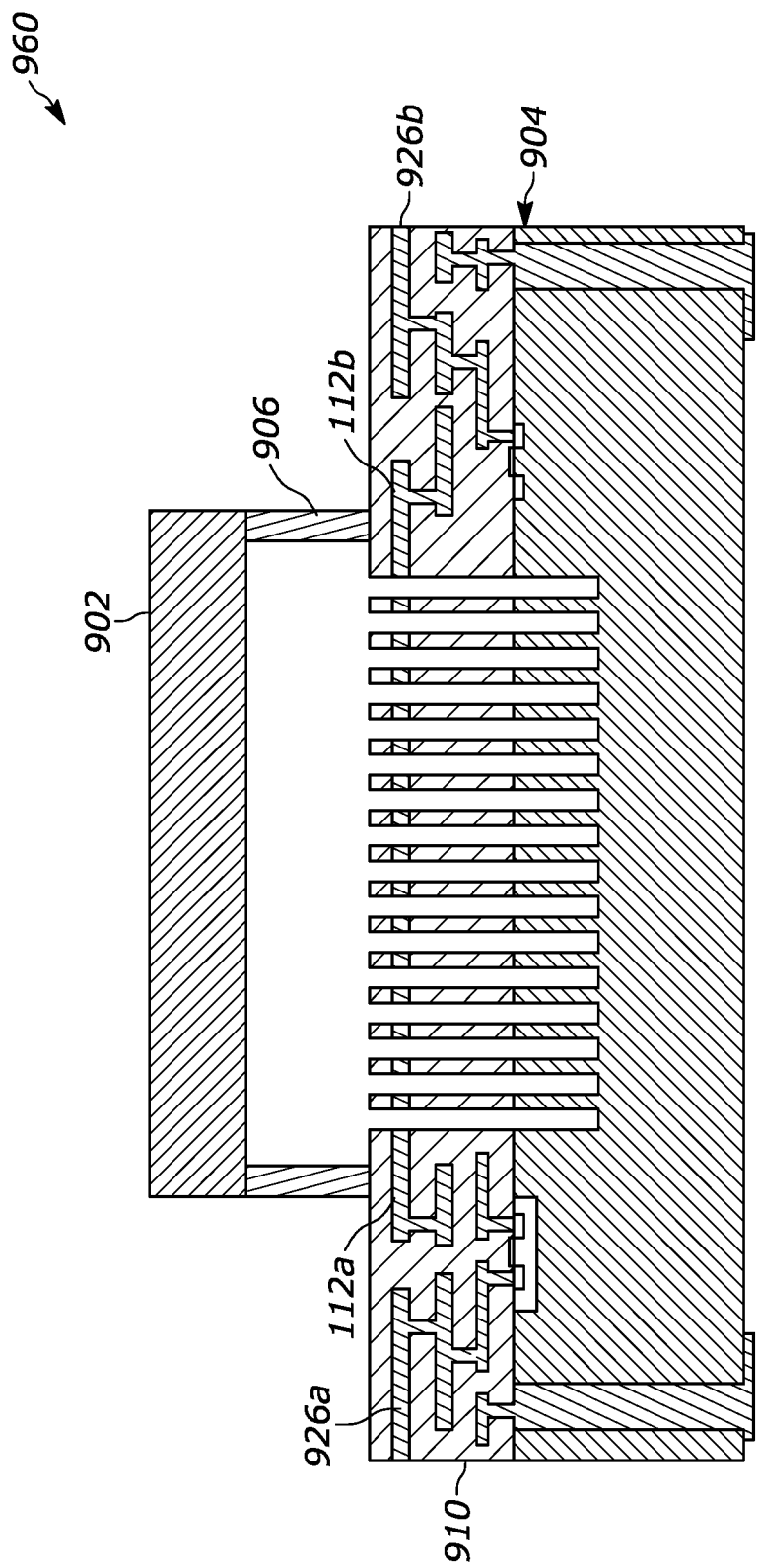
FIG. 9D is a side cross-sectional view of a MEMS die that is another variation of the MEMS die of FIG. 9A.

In an embodiment, the piston is connected to an electrical potential (e.g., electrical ground) through a very large resistor. The resistance of the resistor should be large enough to set the electrical corner frequency below that of the desired low acoustic corner frequency (e.g. 20 Hz). In an embodiment, the resistance may be $10 {\wedge} 12$ ohm. In other embodiments, the resistance may be less or more than $10 {\wedge} 12$ ohm. In an embodiment, the resistor is formed by the electrical leakage conductance of resilient structure 906 and IC 910. In operation, the piston is connected to an electrical potential in a DC sense, but is electrically isolated in the AC sense. In such an embodiment, the movement of the piston towards and away from the electrodes facing the piston results in a change in capacitance between the piston and the electrodes and induces a signal in one of the electrodes (the other electrode being supplied with a DC voltage). An example of this is shown in FIG. 9D (which is a variation on the embodiment described in conjunction with FIG. 9C). In FIG. 9D, a MEMS sensor 960 has the piston 902 configured to be electrically floating. In this embodiment, the electrode 112a is connected to the bias voltage source of the IC 910 via a conductive path 926a and the electrode 112b is connected to a circuit of the IC 910 (e.g., to an amplifier input thereof) via a conductive path 926*b*.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A micro-electro-mechanical systems (MEMS) sensor comprising:
    an integrated circuit (IC) die having an electrode and a cavity defined in the IC die;
    a MEMS die comprising a conductive piston, at least one wall and one or more external conductors facing the electrode of the IC die, wherein the conductive piston is rigid, as compared to the one or more external conductors, and said each external conductor is a resilient member and is electrically connected to the conductive piston at one end and to the at least one wall at the other end;
    a resilient structure coupling the IC die and the MEMS die;
    a substantially enclosed back volume comprising the cavity and at least partially bounded by the conductive piston and the resilient structure, the resilient structure located to prevent air flow radially outwardly from a central portion of the back volume,
    wherein a capacitance is detectable by a circuit of the IC die in response to a change in separation between the conductive piston of the MEMS die and the electrode of the IC die when the conductive piston and the electrode are electrically connected to the circuit.

2. The MEMS sensor of claim 1, further comprising a boss that extends from a center of the conductive piston opposite the back volume.

3. The MEMS sensor of claim 1, further comprising one or more structures extending from the IC die into the cavity and toward the conductive piston, wherein the one or more structures are separated from walls of the cavity and from other structures in the cavity by a distance configured to reduce thermal-acoustic noise in the MEMS sensor.

4. The MEMS sensor of claim 3, wherein the one or more structures comprise a plurality of pillars.

5. The MEMS sensor of claim 3, wherein the electrode of the IC die is located on an end portion of at least one of the one or more structures.

6. The MEMS sensor of claim 1, wherein the conductive piston is laterally constrained by said one or more resilient external conductors.

7. A micro-electro-mechanical systems (MEMS) sensor comprising:
    a conductive piston comprising an integrated circuit (IC) die;
    a substrate comprising an electrode facing the conductive piston;
    a resilient structure coupling the piston and the substrate, the electrode and the piston electrically coupled to a circuit of the IC die;
    a substantially enclosed back volume comprising a cavity between the electrode and the piston, the back volume at least partially defined by the substrate and the resilient structure,
    wherein the cavity is located in the piston and comprises one or more structures that extend from an inner surface of the cavity toward the electrode, each structure is separated from walls of the cavity and from other structures in the cavity by a distance configured to reduce thermal-acoustic noise in the MEMS sensor, and a conductive portion of the piston is located on an end portion of at least one of the one or more structures, the one or more structures comprising a plurality of pillars, and
    wherein, during operation of the MEMS sensor, a capacitance between the piston and the electrode changes as a distance between the piston and the electrode changes.

8. The MEMS sensor of claim 7, wherein the back volume comprises a pierce connected to an environment surrounding the MEMS sensor, and wherein the resilient structure is located to prevent air flow radially outwardly from a central portion of the back volume.

9. The MEMS sensor of claim 7, wherein the electrode is distributed about at least one end portion of the one or more structures.

10. The MEMS sensor of claim 9, wherein the back volume comprises a pierce connected to an environment surrounding the MEMS sensor, and wherein the resilient structure is located to prevent air flow radially outwardly from a central portion of the back volume.

11. A micro-electro-mechanical systems (MEMS) sensor comprising:
    an integrated circuit (IC) die having an electrode;
    a cavity defined in the IC die and comprising one or more structures extending into the cavity, the one or more structures separated from walls of the cavity and from other structures in the cavity by a distance configured to reduce thermal-acoustic noise in the MEMS sensor;
    a MEMS die comprising a conductive piston, at least one wall and one or more external conductors facing the electrode of the IC die, each said external conductor is a resilient member and is electrically connected to the conductive piston at one end and to the at least one wall at the other end, the one or more structures comprising a plurality of pillars extending toward the conductive piston;
    a substantially enclosed back volume comprising the cavity and at least partially bounded by the conductive piston; and
    a resilient structure coupling the IC die and the MEMS die, wherein the back volume is at least partially bounded by the resilient structure, wherein a capacitance is detectable by a circuit of the IC die in response to a change in separation between the conductive piston of the MEMS die and the electrode of the IC die when the conductive piston and the electrode are electrically connected to the circuit,
    wherein the conductive piston is a rigid body, as compared to each said one or more resilient external conductors, each said external conductor is configured to laterally constrain the conductive piston as the separation between the conductive piston of the MEMS die and the electrode of the IC die changes, and wherein the electrode is located on an end portion of at least one of the one or more structures extending into the cavity and toward the conductive piston.

\* \* \* \* \*